US006819356B1

(12) United States Patent
Yumoto

(10) Patent No.: US 6,819,356 B1
(45) Date of Patent: Nov. 16, 2004

(54) IMAGE SEARCH METHOD IN ELECTRONIC STILL CAMERA WITH GPS RECEPTION FUNCTION

(75) Inventor: Noboru Yumoto, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/441,262

(22) Filed: Nov. 16, 1999

(30) Foreign Application Priority Data

Nov. 18, 1998 (JP) .......................................... 10-328247

(51) Int. Cl.$^7$ ............................................... H04N 5/76
(52) U.S. Cl. .................................... 348/231; 348/231.3
(58) Field of Search ............................ 348/231.2, 231.3

(56) References Cited

U.S. PATENT DOCUMENTS

| | | | | |
|---|---|---|---|---|
| 5,819,103 A | * | 10/1998 | Endoh et al. .................. | 710/1 |
| 5,883,677 A | * | 3/1999 | Hofmann .................... | 348/584 |
| 6,538,698 B1 | * | 3/2003 | Anderson .............. | 348/333.05 |
| 2003/0117297 A1 | * | 6/2003 | Obradovich et al. ........ | 340/905 |

* cited by examiner

*Primary Examiner*—Andrew Christensen
*Assistant Examiner*—Dorothy Wu
(74) *Attorney, Agent, or Firm*—Frishauf, Holtz, Goodman & Chick, P.C.

(57) ABSTRACT

In an image pick-up mode, when a piece of image information is picked-up by an image information acquisition unit, pieces of position information acquired by a position measurement unit are stored in a storage unit together with the pieces of image information in association with each other. In a playback mode, when the scroll key of a key input unit is kept pressed for a predetermined time or more, pieces of position information stored in the storage unit in association with pieces of image information are sequentially read out. An arithmetic unit sequentially calculates the distance between pick-up points of two pieces of image information, and a search unit determines whether the calculated distance is equal to or longer than a predetermined distance acquired by a condition acquisition unit. When the search unit searches for a calculated distance equal to or longer than the predetermined distance, a display control unit displays, on a display unit, a searched item of image information, i.e., a piece of image information picked-up at a place apart from the image pick-up place of immediately preceding item of image information by the predetermined distance or more.

25 Claims, 27 Drawing Sheets

SEARCH CONDITION
(THRESHOLD)

IMAGE SEARCH METHOD IN ELECTRONIC STILL CAMERA WITH GPS RECEPTION FUNCTION

BACKGROUND OF THE INVENTION

The present invention relates to an image search apparatus and method and, more particularly, to an image search apparatus, electronic still camera apparatus, and image search method suitably used for an electronic still camera capable of recording image pick-up position information together with image information.

This application is based on Japanese Patent Application No. 10-328247, filed Dec. 18, 1998, the entire content of which is incorporated herein by reference.

In recent years, electronic still cameras capable of picking-up, storing, and displaying images as digital signals, and card type camera units mounted on notebook type personal computers and the like have been developed and commercially available. Such electronic still camera can pick-up a larger number of images than 24 or 36 images of a general silver halide photographing film. This electronic still camera is required for a high-speed image search method and display method excellent in operability in reproducing and displaying images.

In general, when a desired image is to be displayed on a liquid crystal display (to be referred to as an LCD) or the like in an electronic still camera or the like, images are visually checked and searched for to extract the desired image by a scroll display method of sequentially displaying images one by one based on the image pick-up time, or a multi-window display method of displaying a plurality of thumbnail images on four or nine windows at once. Therefore, a search for a desired image spends a long time and a great deal of labor.

On the other hand, electronic still cameras adopting a technique of storing position information measured by GPS (Global Positioning System) in association with image information have recently been known.

A method of searching for a desired image from images picked-up by the electronic still camera includes (i) a method of inputting and designating a certain position on a map displayed on the monitor to search for an image picked-up at the position (or its periphery), and (ii) a method of inputting a place name or the like to search for an image picked-up at the position corresponding to the place name.

However, according to the search method (i), the map information amount is very large, and a signal processing for displaying the map information is necessary. A desired area of place must be searched for by scrolling a map displayed on the monitor in order to input and designate a desired position. This method cannot realize simple, high-speed image search processing and display processing with a simple arrangement and processing.

According to the search method (ii), character data such as a place name must be input as a search condition, which complicates input operation. A desired image cannot be searched for unless the user remembers the place name of the image pick-up place of the desired image. This method cannot also realize simple, high-speed image search processing and display processing.

BRIEF SUMMARY OF THE INVENTION

Accordingly, it is an object of the present invention to provide an image search apparatus, electronic still camera apparatus, and image search method capable of easily searching for and extracting a desired image from a large number of images.

To achieve the above object, according to one preferable aspect of the present invention, an image search apparatus for searching, from a plurality of pieces of image information, for a piece of image information satisfying a predetermined condition, comprises storage means for storing a plurality of pieces of image information, and search means for searching, from the plurality of pieces of image information stored in the storage means, for a piece of image information in which a distance between image pick-up positions where pieces of image information are picked-up satisfies a predetermined condition. There can be provided an image search apparatus capable of easily searching for and extracting a desired image from a large number of images at a high speed.

According to another preferable aspect, an image search apparatus for searching, from a plurality of pieces of image information, for a piece of image information satisfying a predetermined condition, comprises storage means for storing a plurality of pieces of image information, and search means for searching, from the plurality of pieces of image information stored in the storage means, for pieces of image information in which azimuths of image pick-up positions where images are picked-up satisfy the predetermined condition. There can be provided an image search apparatus capable of easily searching for and extracting a desired image from a large number of images at a high speed.

According to still another preferable aspect, an electronic still camera apparatus capable of outputting image information to an image search apparatus for searching, from a plurality of pieces of image information, for a piece of image information satisfying a predetermined condition comprises image pick-up means for picking-up an image of an object, position measurement means for measuring an image pick-up position, arithmetic means for calculating a distance between image pick-up positions measured by the position measurement means, search means for searching for a piece of image information in which the distance calculated by the arithmetic means satisfies the predetermined condition, and storage means for storing the image information picked-up by the image pick-up means and storing identification information in association with pieces of the image information searched for by the search means among the image information stored. There can be provided an electronic still camera apparatus capable of transferring information stored in the storage means to the image search apparatus such as a personal computer, and easily searching for and extracting a desired image from a large number of images using the identification information at a high speed.

According to still another preferable aspect, an electronic still camera apparatus capable of outputting image information to an image search apparatus for searching, from a plurality of pieces of image information, for a piece of image information satisfying a predetermined condition, comprises image pick-up means for picking-up an image of an object, position measurement means for measuring an image pick-up position, arithmetic means for calculating a distance between image pick-up positions measured by the position measurement means, and storage means for storing the image information picked-up by the image pick-up means, and storing the distance calculated by the arithmetic means in association with the image information. There can be provided an electronic still camera apparatus capable of transferring information stored in the storage means to the image search apparatus such as a personal computer, and easily searching for and extracting a desired image from a large number of images using the distance information at a high speed.

According to still another preferable aspect, an electronic still camera apparatus capable of outputting image information to an image search apparatus for searching, from a plurality of pieces of image information, for a piece of image information satisfying a predetermined condition comprises image pick-up means for picking-up an image of an object, position measurement means for measuring an image pick-up position, arithmetic means for calculating a distance between image pick-up positions measured by the position measurement means, search means for searching for pieces of image information in which the distances calculated by the arithmetic means satisfy the predetermined condition, and storage means for storing the image information picked-up by the image pick-up means, and storing, as the same group, pieces of image information searched for by the search means. There can be provided an electronic still camera apparatus capable of transferring information stored in the storage means to the image search apparatus such as a personal computer, and easily searching for and extracting a desired image from a large number of images using the group information at a high speed.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

A preferred embodiment of an image search apparatus according to the present invention will now be described with reference to the accompanying drawings.

Figure 1:
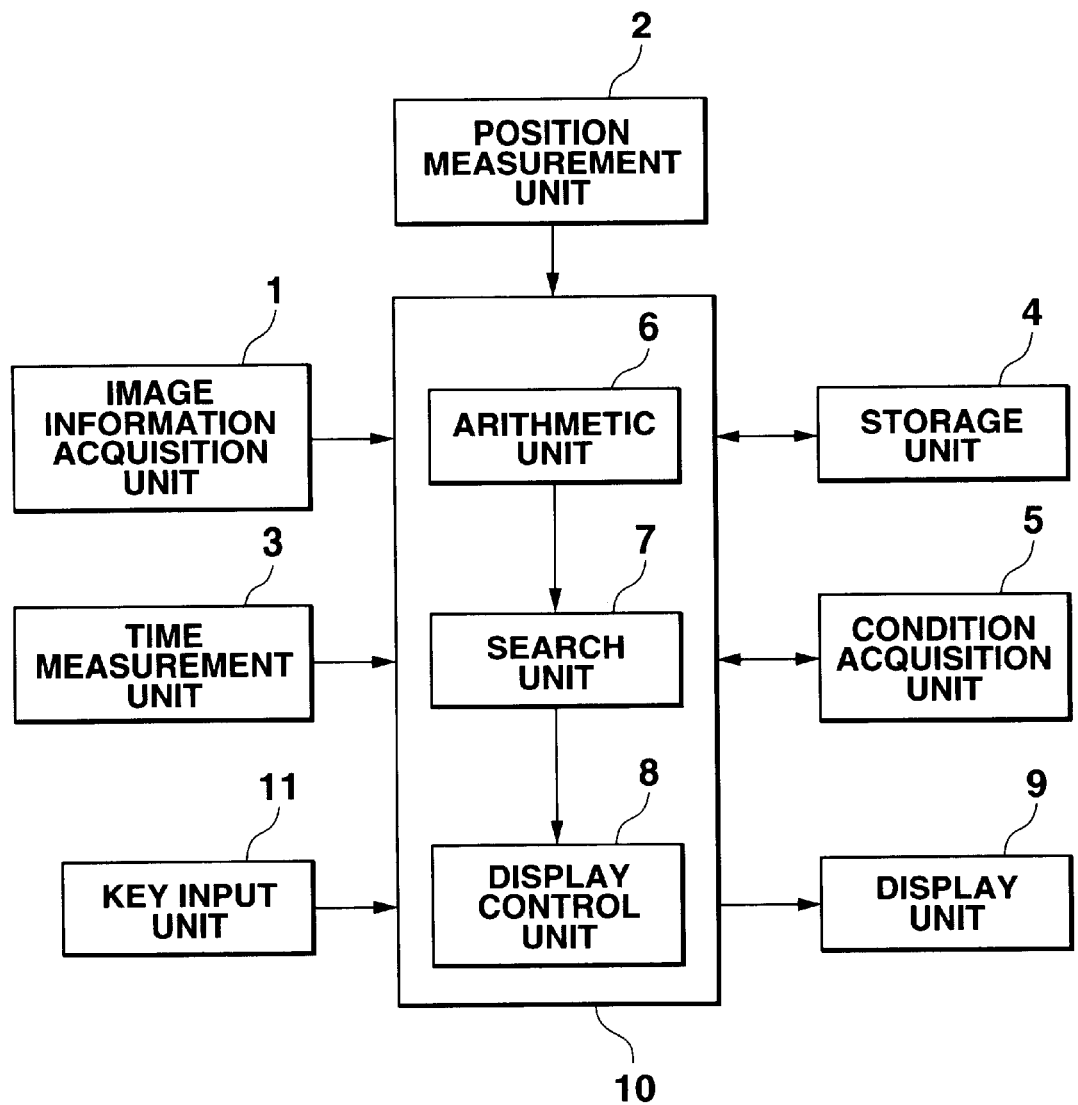
FIG. 1 is a block diagram showing the basic arrangement of an image search apparatus according to the present invention.

FIG. 1 is a block diagram showing the basic arrangement of an image search apparatus (e.g., a portable personal computer, portable information terminal, or portable telephone with a GPS reception function and an image pick-up function) according to the present invention.

As shown in FIG. 1, the image search apparatus comprises an image information acquisition unit 1, position measurement unit 2, time measurement unit 3, storage unit 4, condition acquisition unit 5, arithmetic unit 6, search unit 7, display control unit 8, display unit 9, and key input unit 11.

The image information acquisition unit 1 acquires predetermined image information as a digital signal by picking-up, receiving, downloading, and the like. The position measurement unit 2 measures and acquires an image information acquisition position or place as absolute or relative position information.

Note that when the image search apparatus is applied to a personal computer or portable information terminal not equipped with any GPS reception function (position measurement unit 2) and image pick-up function, the image information acquisition unit 1 serves as a receiving unit for receiving an image information and an acquisition position information of the image information that are transmitted from an external electronic still camera with the GPS reception function.

The time measurement unit 3 functions as a timepiece incorporated in the image search apparatus, and measures and acquires the image pick-up (acquisition) time of image information as time information.

The storage unit 4 stores pieces of image information in association with their position information. The storage unit 4 may be incorporated in the image search apparatus or detachable from it.

Figure 13:
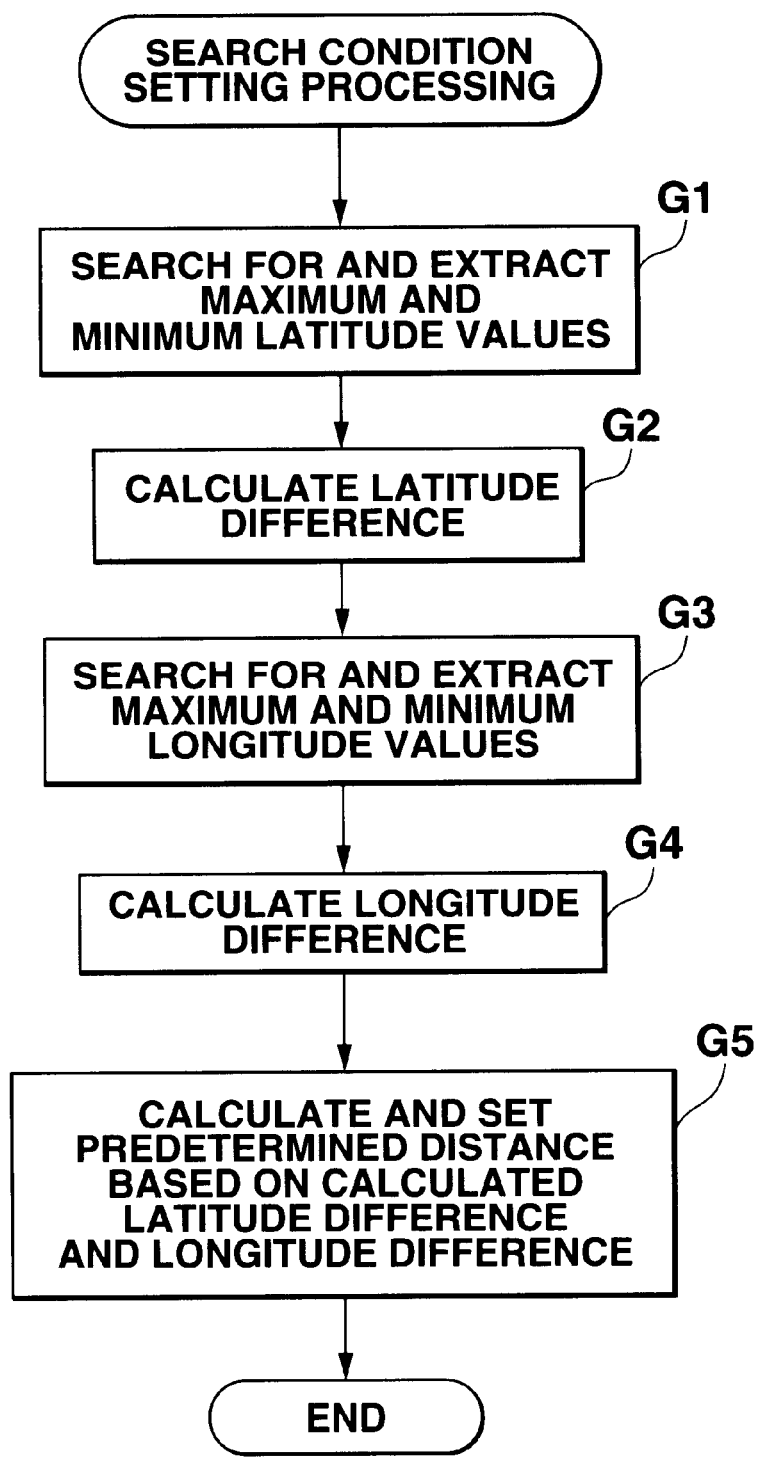
FIG. 13 is a flow chart showing a detailed example of a search condition setting processing.

The condition acquisition unit 5 acquires search condition information for searching for the image information stored in the storage unit 4 by an input from the key input unit 11 or predetermined learning processing (see FIG. 13).

The arithmetic unit 6 extracts the position information stored in the storage unit 4, and calculates the distance (including an altitude difference) or azimuth between the image information acquisition positions as a specific amount.

The search unit 7 compares the search condition information (threshold) acquired by the condition acquisition unit 5 and the specific amount (distance or azimuth), and extracts image information satisfying the search condition information. The display control unit 8 displays the image information extracted by the search unit 7 on the display unit 9 prior to other image information or displays the image information by a different display method from that of the other image information.

The key input unit 11 comprises a mode switching key for setting an image pick-up (reception) mode, reproduce (playback) mode, and search condition information (distance, azimuth, or the like) input mode, shutter key for instructing image pick-up, scroll (page-feed) keys (including plus and minus keys) for switching a reproduced image to a next image, reset key, execution key, and the like.

The arithmetic unit 6, search unit 7, and display control unit 8 constitute a controller 10, and the functions of the respective units are realized by, e.g., one microprocessor.

Respective functions realized by this arrangement will be sequentially explained.

(Image Information Storage Processing)

Image information acquisition processing and storage processing of the image search apparatus according to the embodiment will be described with reference to FIG. 2.

Figure 2:
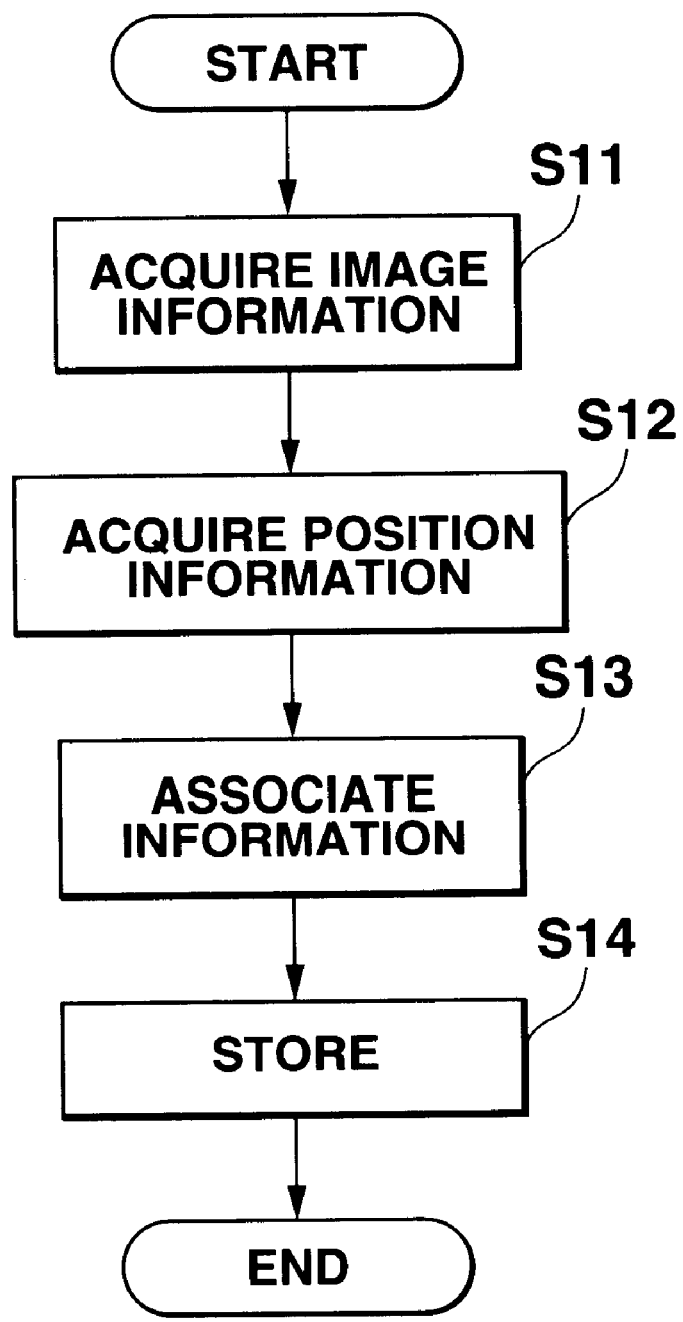
FIG. 2 is a flow chart showing an image information acquisition processing and a storage processing in the image search apparatus.

FIG. 2 is a flow chart showing an image information acquisition processing and a storage processing in the image search apparatus.

The mode switching key of the key input unit 11 is operated to set an image recording state, i.e., image information acquisition (image pick-up standby) state (image pick-up mode). Then, the shutter key of the key input unit 11 is operated to acquire a target image as a digital signal by the image information acquisition unit 1. In this way, image information is acquired (step S11).

In acquiring a piece of image information (picking-up an image of a target object), the position information (latitude, longitude, and altitude information) of the image information acquisition place is measured and acquired by the position measurement unit 2 (step S12). More specifically, a signal transmitted from a position measurement satellite based on the GPS position measurement method is received by a GPS antenna, and the latitude, longitude, and altitude are calculated and acquired as position information.

The acquired image information and position information are stored in a predetermined area of the storage unit 4 in association with each other (steps S13 and S14).

Processing of associating the image information and position information will be explained with reference to FIG. 3.

Figure 3:
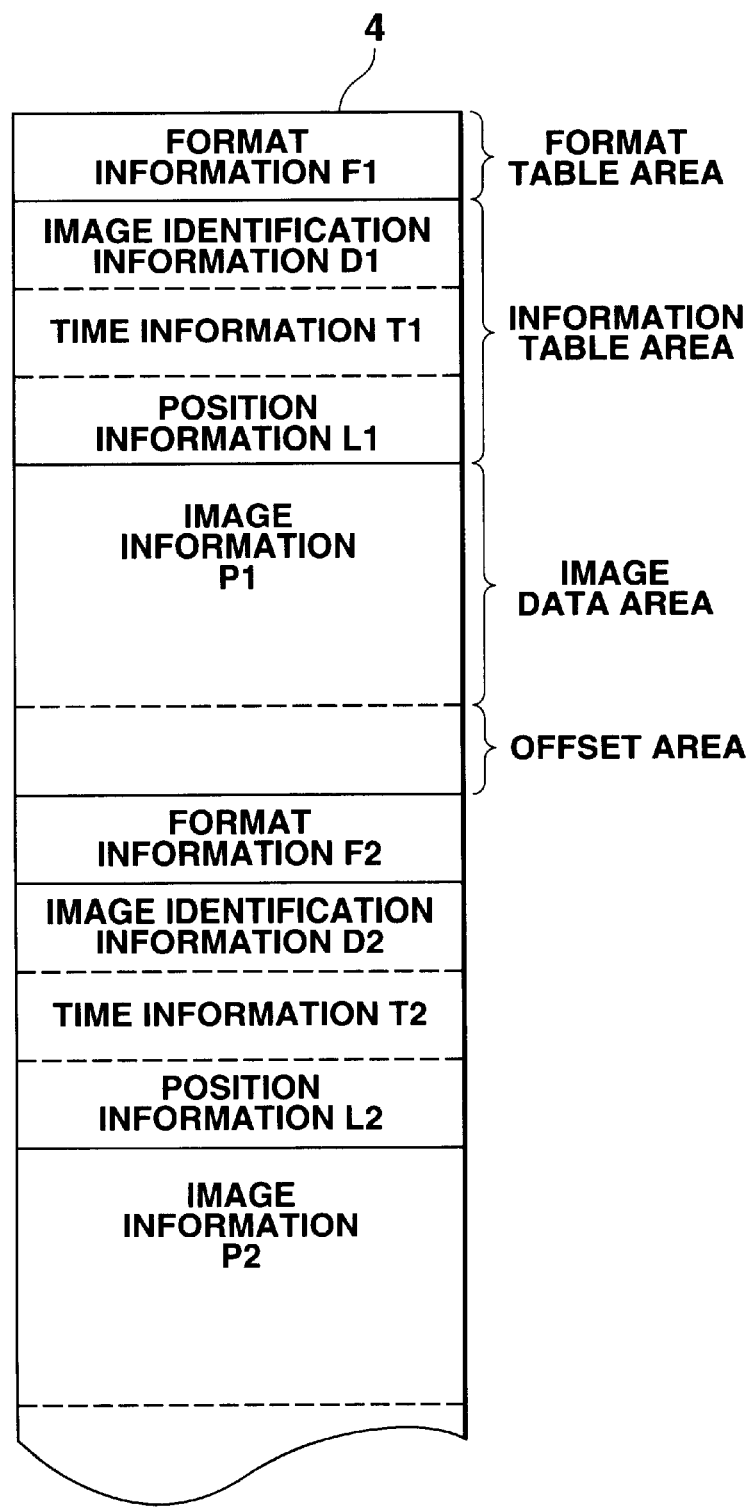
FIG. 3 is a conceptual view showing the internal area of a storage unit.

FIG. 3 is a conceptual view showing the internal area of the storage unit 4 where the image information is stored.

As shown in FIG. 3, the internal area of the storage unit 4 is roughly constituted by a format table area, information table area, image information area, and offset area.

The format table area stores comprehensive information about image information, i.e., pieces of format information F1, F2, The information table area stores information for identifying image information, such as pieces of image information identification information D1, D2, . . . including number information for identifying image information, pieces of time information T1, T2, . . . representing image information acquisition (image pick-up) times, and pieces of position information L1, L2, . . . representing image information acquisition (image pick-up) places.

The image information area stores pieces of acquired image information P1, P2, . . . having undergone image processing such as compression. The offset area stores offset data (blank) for changing the data lengths of the pieces of image information P1, P2, in the image information area to fixed lengths.

The pieces of image information P1, P2, . . . are stored in association with, as headers, the pieces of image identification information D1, D2, . . . , the pieces of the time information T1, T2, . . . , and the pieces of the position information L1, L2, . . . stored in the information table area.

When the image search apparatus is applied to a personal computer or portable information terminal not equipped with any GPS reception function (position measurement unit 2) and image pick-up function, as described above, the mode switching key of the key input unit 11 is operated to set the image information reception state (reception mode) in step S11, and the image information acquisition unit 1 receives the image information and the acquisition position information of the image information (i.e., information shown in FIG. 3) transmitted via a wire (cable or the like) or radio channel (radio waves, infrared rays, or the like) from an external electronic still camera with the GPS reception function. After that, the flow skips steps S12 and S13, and shifts to step S14 to store the received image information and acquisition position information in a predetermined area of the storage unit 4.

Note that if the image information and the acquisition position information are acquired in step S11 by attaching to the image search apparatus a detachable memory card which stores information as shown in FIG. 3 and is attached to an electronic still camera with the GPS reception function, processes in steps S12 to S14 need not be executed.

(Image Information Search Processing)

Image information search processing of the image search apparatus according to this embodiment will be explained with reference to FIG. 4.

Figure 4:
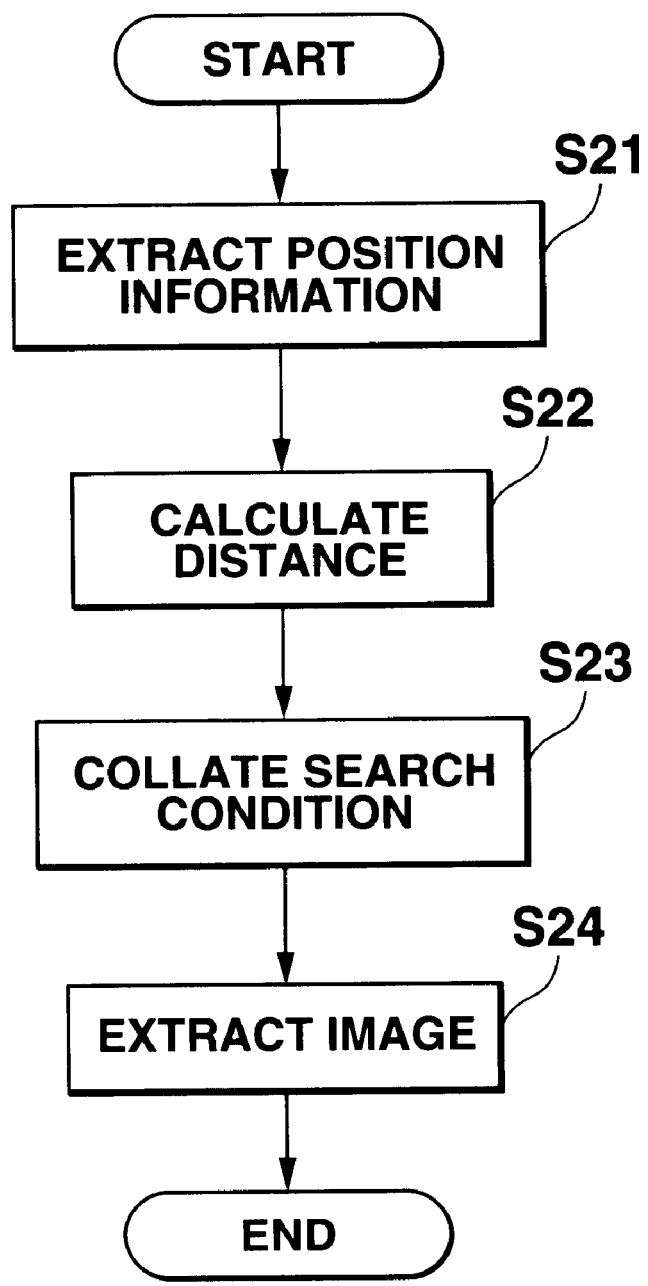
FIG. 4 is a flow chart showing an example of an image information search processing.

FIG. 4 is a flow chart showing an example of an image information search processing in the image search apparatus. In FIG. 4, the specific amount calculated based on the position information is the distance.

The mode switching key of the key input unit 11 is operated to set an image playback state (a reproduce or playback mode), i.e., an image information display state (a display mode), and pieces of the position information associated with corresponding pieces of image information stored in the storage unit 4 are extracted (step S21). The distances between the acquisition places of the pieces of image information are calculated (step S22). More specifically, the distance between two points is calculated based on latitudes and longitudes obtained by the GPS position measurement method.

The calculated distance is collated with search condition information for selecting and extracting an image (step S23), and an image information having a distance satisfying the condition is extracted (step S24). In this case, a desired search condition information may be input and set in the condition acquisition unit 5 by the user of the image search apparatus by operating the key input unit 11 in an image information search processing. Search condition information previously stored in the image search apparatus may be acquired. Instead, search condition information may be set by learning processing based on the appearance frequency (trend) of search condition information set in the past, or may be set based on the statistical trend of the currently calculated distance, e.g., user's action sphere determined by the maximum latitude difference and maximum longitude difference of position information (see FIG. 13).

Detailed examples of a processing of calculating the distance between the acquisition places of pieces of image information, and a processing of collating the calculated distance and search condition information will be explained with reference to FIGS. 5A and 5B.

Figure 5A:
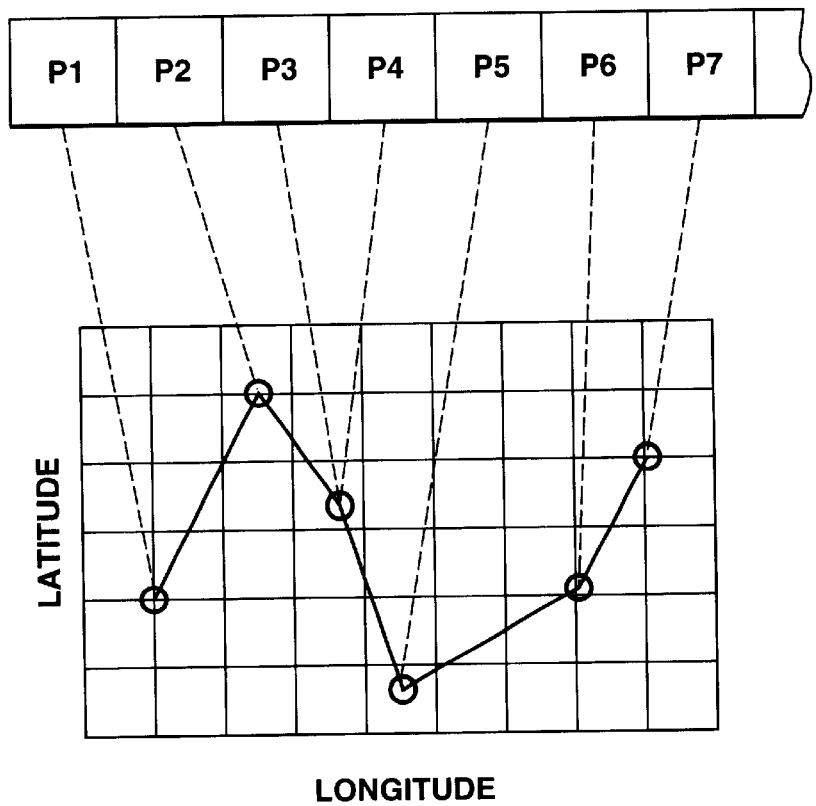
FIGS. 5A and 5B are views showing an example of a distance calculation processing and a search condition collation processing.
Figure 5B:
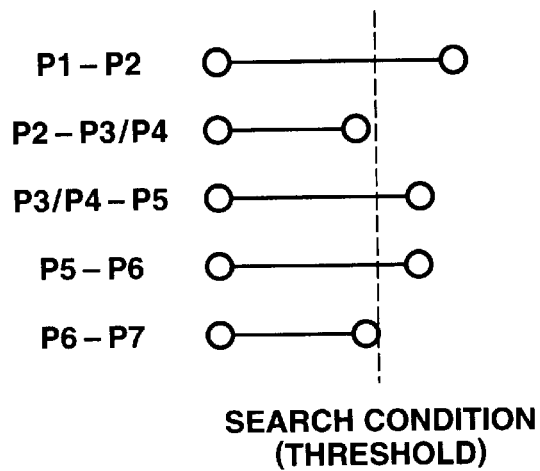

FIGS. 5A and 5B are views showing an example of a distance calculation processing and a search condition collation processing.

As shown in FIG. 5A, pieces of the position information are extracted for pieces of image information P1, P2, P3, . . . stored (or managed) in time-series in accordance with acquisition times. In FIG. 5A, the position information includes a latitude and longitude measured by the GPS position measurement method. Relative distances P1–P2, P2–P3/P4, P3/P4–P5, . . . between the acquisition places of the two consecutive pieces of image information P1, P2, P3, are calculated by the Pythagorean theorem from the latitude difference and the longitude difference between places (two points) where pieces of image information stored in adjacent to each other are acquired.

As shown in FIG. 5B, an input search condition information is set as a threshold (indicated by the dotted line), and pieces of image information P2, P5, and P6 acquired at places having distances P1–P2, P3/P4–P5, and P5–P6 larger than, e.g., the threshold are extracted or marked as search results.

In this fashion, the distances between the pick-up places of the two consecutive images are calculated, and an image is searched for using this distance information. As a result, the first (or last) image information picked-up at each image pick-up area can be searched for.

Detailed examples of a search processing and a display processing when the playback (reproduce) mode is set by operating the mode switching key of the key input unit 11 will be explained with reference to FIG. 6.

Figure 6:
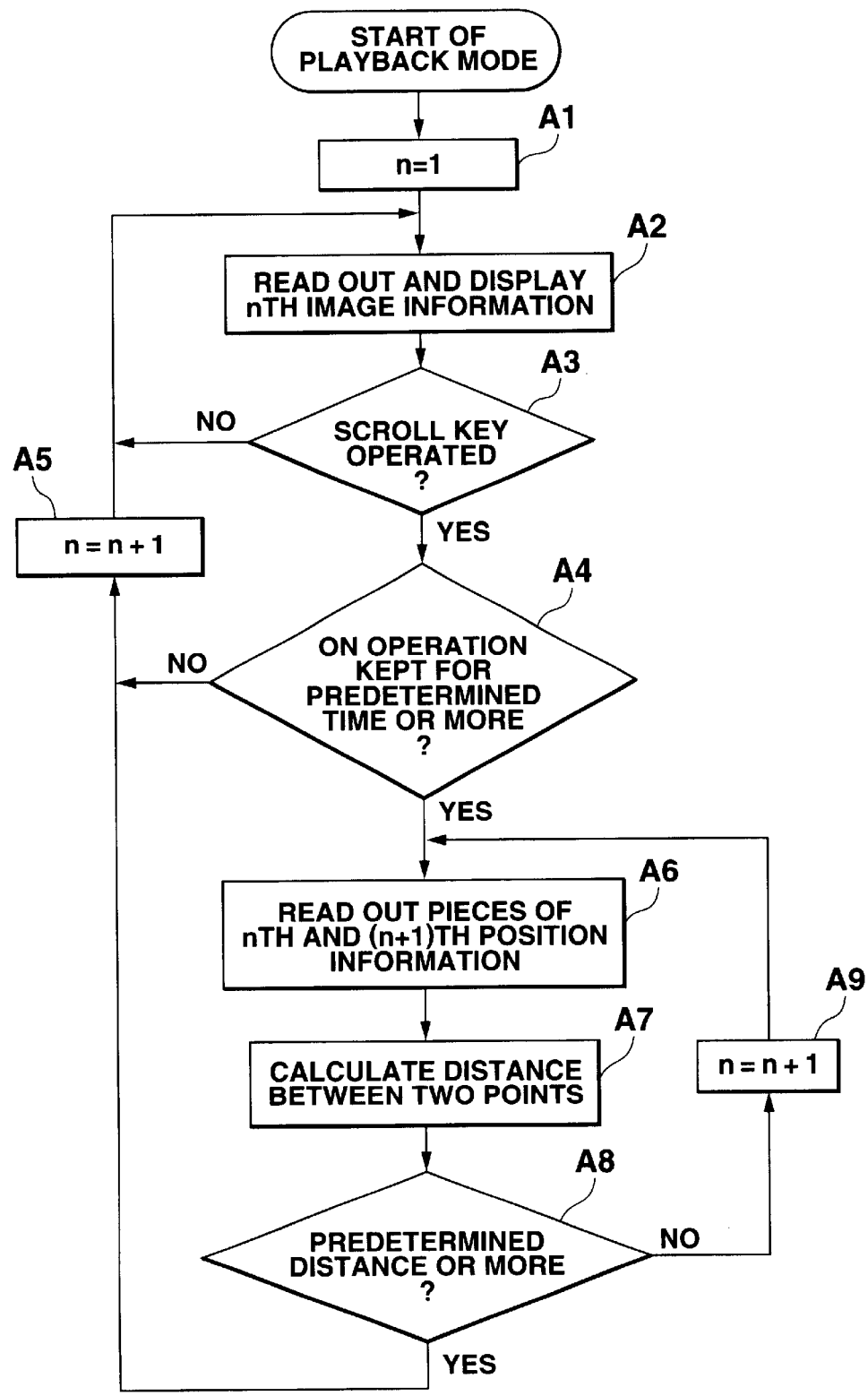
FIG. 6 is a flow chart showing a detailed example of the image information search processing shown in FIG. 4 and a display processing.

FIG. 6 is a flow chart for explaining the search processing shown in the flow chart of FIG. 4 and a display processing.

If a user operates the mode switching key of the key input unit 11 to set the playback mode, an image number n for designating image information to be displayed on the display unit 9 is set to n=1 (step A1).

Image information (i.e., nth image information) designated by the image number n is read out from the storage unit 4 and displayed on the display unit 9 (step A2).

The nth image information is kept displayed by processing of step A2 until operation of the scroll key of the key input unit 11 is detected in step A3.

If the scroll key is operated during display of the image information (YES in step A3), it is determined whether the scroll key is kept pressed for a predetermined time (e.g., 2 sec) or more (step A4).

If NO in step A4, i.e., the scroll key is released before the predetermined time has elapsed, the flow shifts to step A5 to increment the image number n by one, and returns to step A2 to display next image information.

If YES in step A4, i.e., the scroll key is kept pressed for the predetermined time or more, the flow advances to step A6 to read out pieces of the position information stored in the storage unit 4 in association with pieces of the nth and (n+1)th image information.

Then, the distance between two points represented by the pieces of the readout position information is calculated using the above-mentioned distance calculation method (step A7). It is determined whether the calculated distance is equal to or longer than the predetermined distance (the search condition information) acquired by the condition acquisition unit 5 (step A8).

If NO in step A8, i.e., the calculated distance is shorter than the predetermined distance, the flow shifts to step A9 to increment the image number n by one, and returns to step A6.

Processes in steps A6 to A9 are repeated until the distance is determined in step A8 to be equal to or longer than the predetermined distance.

If YES in step A8, i.e., the calculated distance (the distance P4–P5 or P9–P10 shown in FIG. 11B) is equal to or longer than the predetermined distance, the flow advances to step A5 to increment the image number n by one, and returns to step A2 to display image information (P5 or P10 shown in FIG. 11B) picked-up at a place apart from the image pick-up place of an immediately preceding image information by the predetermined distance or more.

Figure 11A:
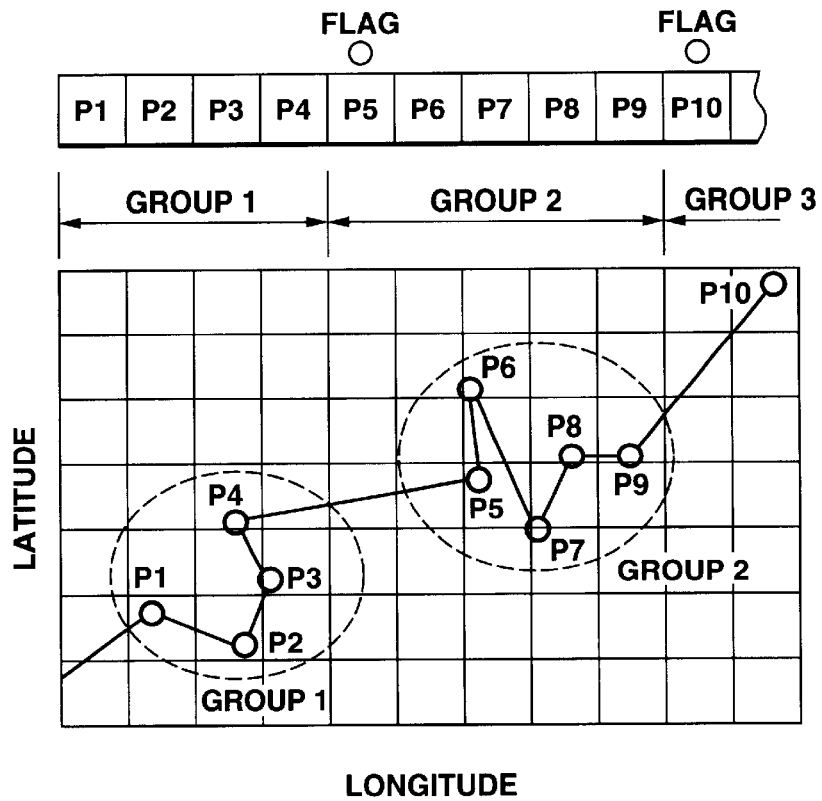
FIGS. 11A and 11B are views showing another example of the distance calculation processing and the search condition collation processing.
Figure 11B:
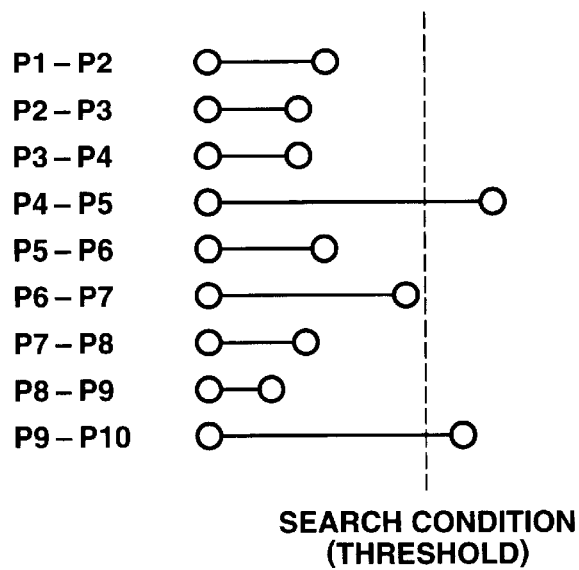

By repeating operation of pressing the scroll key for a predetermined time (or keeping pressing the scroll key for a predetermined time or more), image information picked-up at places apart from the image pick-up place of immediately preceding image information by a predetermined distance or more (i.e., pieces of the first image information P5 and P10 picked-up in areas represented as groups 2 and 3 shown in FIG. 11A) are sequentially displayed on the display unit 9. When the first image information in an area where desired image information is picked-up is displayed, scroll operation is switched to a normal one (operation of pressing the scroll key for less than a predetermined time), and pieces of subsequent image information are sequentially displayed to display desired image information.

Pieces of image information are sequentially searched for and displayed from the oldest image (P1) in the flow chart of FIG. 6, but may be searched for and displayed from the latest image.

In this case, pieces of image information (P4 and P9) finally picked-up in respective areas are displayed.

In step A8 of the flow chart shown in FIG. 6, when the distance between two points is the predetermined distance or more, the flow shifts to steps A5 and A2 to display a searched image. Alternatively, a searched image may be displayed when the distance between two points is the predetermined distance or less.

Distance calculation processing and search condition collation processing (steps A6 to A8) are executed in reproducing image information in the flow chart of FIG. 6, but may be executed in image pick-up time or at arbitrary time.

Detailed examples of image pick-up processing, search processing, and display processing when the distance calculation processing and the search condition collation processing are executed in image pick-up time will be described with reference to FIGS. 7A and 7B.

Figure 7A:
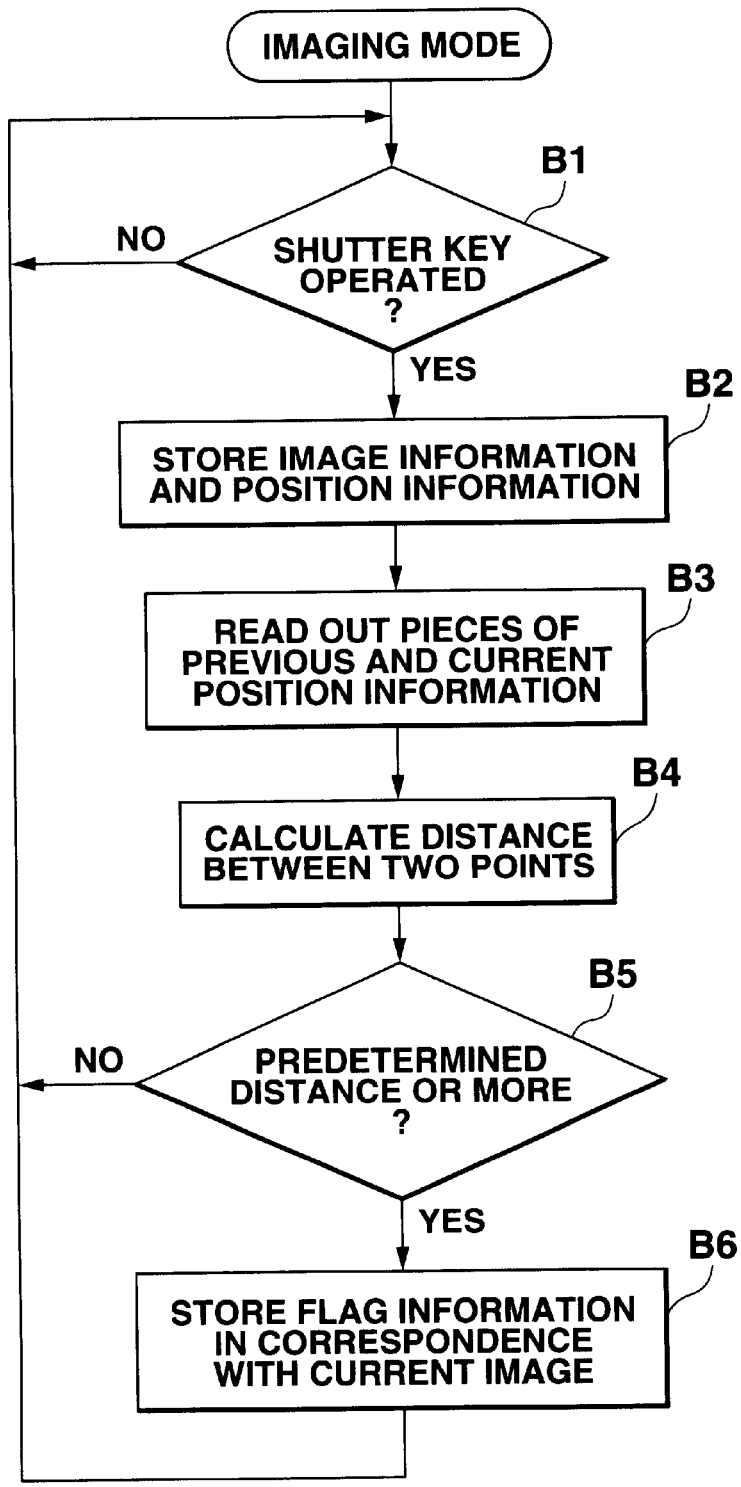
FIGS. 7A, 7B, 7C, and 7D are flow charts showing a modification of the image information search/display processing shown in FIG. 6.
Figure 7B:
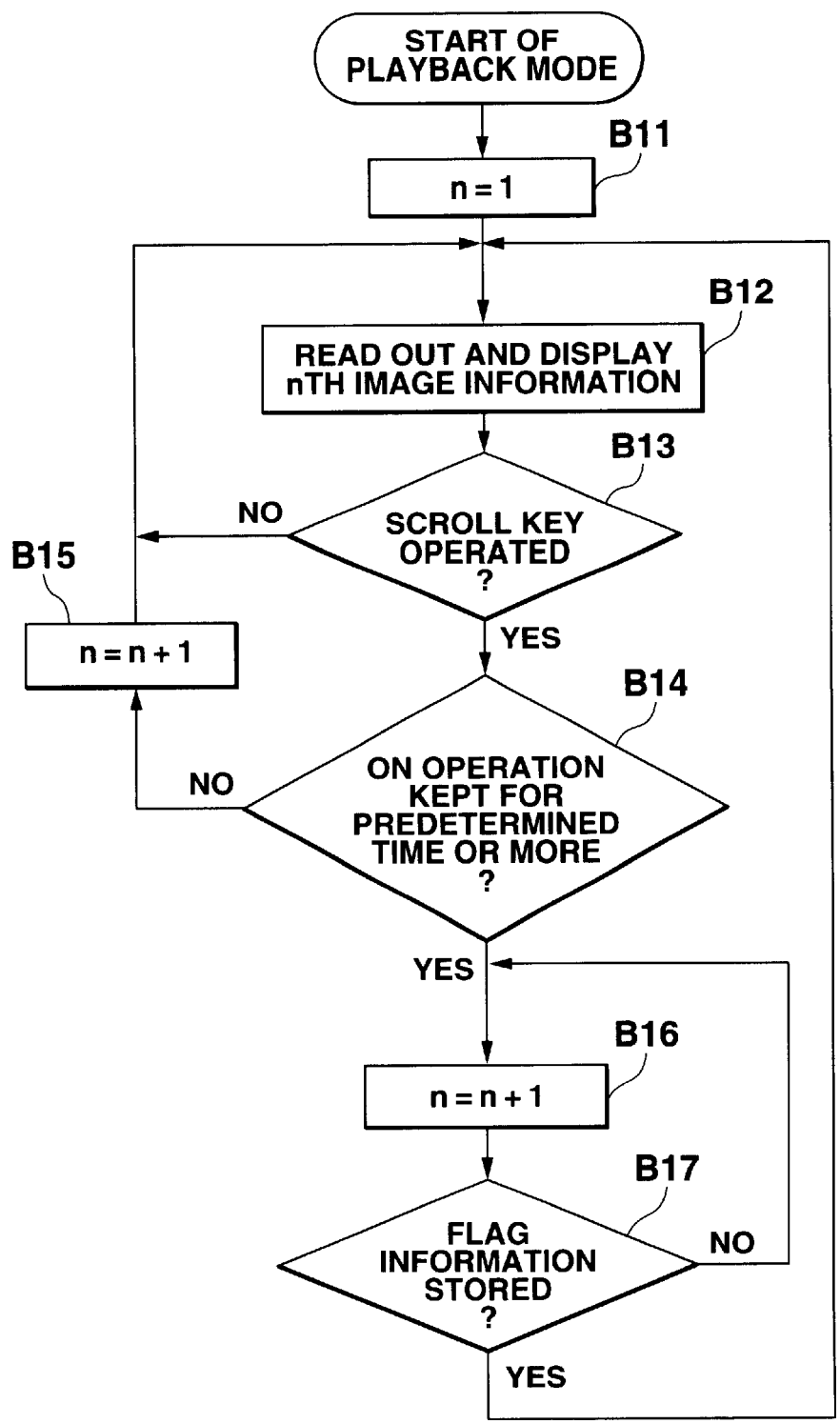

FIGS. 7A and 7B are flow charts, respectively, showing processes in the image pick-up mode and playback mode for explaining a modification of the flow chart shown in FIG. 6.

In FIG. 7A, if the user operates the mode switching key of the key input unit 11 to set the image pick-up mode, and operates the shutter key at arbitrary timing (YES in step B1), a target image is received as a digital signal by the image information acquisition unit 1 to acquire image information and store it in a predetermined area of the storage unit 4. At the same time, position information about the acquisition place of the image information is acquired by measurement of the position measurement unit 2, and stored in a predetermined area of the storage unit 4 in association with the image information (step B2).

Position information which is acquired by previous image pick-up operation and already stored in the storage unit 4, and position information which is acquired by current image pick-up operation and newly stored in the storage unit 4 are read out (step B3).

The distance between two points represented by the readout position information is calculated using the above-mentioned distance calculation method (step B4). It is determined whether the calculated distance is equal to or longer than a predetermined distance (a search condition) acquired by the condition acquisition unit 5 (step B5).

If NO in step B5, i.e., the calculated distance is shorter than the predetermined distance, the flow returns to step B1 to wait for a next shutter key operation.

If YES in step B5, i.e., the calculated distance (P4–P5 or P9–P10 shown in FIG. 11B) is equal to or longer than the predetermined distance, the flow shifts to step B6. Flag information representing that the image information obtained by the current image pick-up operation is one (P5 or P10 shown in FIG. 11B) picked-up at a place apart from the previous image pick-up place by the predetermined distance or more is stored as one image identification information in the storage unit 4 in association with the current image information.

Then, the flow returns to step B1 to wait for a next shutter key operation.

By this processing, flag information is stored in correspondence with the image information picked-up at a place apart from the image pick-up place of the immediately preceding image information by the predetermined distance or more (i.e., pieces of the first image information P5 or P10 picked-up in respective areas represented as group 2 or 3 shown in FIG. 11A).

In FIG. 7B, if the user operates the mode switching key of the key input unit 11 to set the playback mode, the image number n for designating image information to be displayed on the display unit 9 is set to n=1 (step B11).

Image information (i.e., nth image information) designated by the image number n is read out from the storage unit 4 and displayed on the display unit 9 (step B12).

The nth image information is kept displayed by processing of step B12 until operation of the scroll key of the key input unit 11 is detected in step B13.

If the scroll key is operated during display of the image information (YES in step B13), it is determined whether the scroll key is kept pressed for a predetermined time (e.g., 2 sec) or more (step B14).

If NO in step B14, i.e., the scroll key is released before the predetermined time has elapsed, the flow shifts to step B15 to increment the image number n by one, and returns to step B12 to display next image information.

If YES in step B14, i.e., the scroll key is kept pressed for the predetermined time or more, the image number n is increased by one in step B16. Then, the flow shifts to step B17 to determine whether flag information is stored in the storage unit 4 in correspondence with the image information designated by the image number n.

If NO in step B17, i.e., the flag information is not stored in the storage unit 4, the flow returns to step B16 to repeat processes in steps B16 and B17 until it is determined in step B17 that the flag information is stored.

If YES in step B17, i.e., the flag information is stored as shown in FIG. 11A, the flow returns to step B12 to display the image information (P5 or P10 shown in FIG. 11A) designated by the image number n at that time.

As described above, the flow charts shown in FIGS. 7A and 7B can also attain the same effects as those of the flow chart shown in FIG. 6.

Since the distance calculation processing and the search condition collation processing (steps B3 to B5) are executed in the image pick-up mode in the flow charts of FIGS. 7A and 7B, the processing load in the playback mode can be reduced to increase the display processing speed, compared to processing in the flow chart of FIG. 6.

In step B5 of the flow chart shown in FIG. 7A, when the distance between two points is the predetermined distance or more, the flow advances to step B6 to store the flag information. Alternatively, the flag information may be stored when the distance between two points is less than the predetermined distance.

In the flow charts of FIGS. 7A and 7B, the image pick-up processing shown in FIG. 7A and the playback processing shown in FIG. 7B are executed in the same image search apparatus. It is, however, also possible that only the image pick-up processing shown in FIG. 7A is executed in an electronic still camera with the GPS reception function, storage information such as data shown in FIG. 3 is transferred to an image search apparatus such as a personal computer by removing a detachable memory card from the electronic still camera and attaching it to the image search apparatus, or via a wire (cable or the like) or radio channel (radio waves, infrared rays, or the like), and the playback processing shown in FIG. 7B is executed in the image search apparatus.

In the flow charts of FIGS. 7A and 7B, the distance calculation processing, search condition processing, and flag information storage processing (steps B3 to B6) are performed in the image pick-up mode, and the determination processing (step B17) of presence/absence of the stored flag information is performed in the playback mode. Instead, the distance calculation processing and calculated-distance information storage processing may be performed in the image pick-up mode, and the distance information read processing and search condition collation processing may be performed in the playback mode.

Detailed examples of processing will be explained with reference to FIGS. 7C and 7D.

Figure 7C:
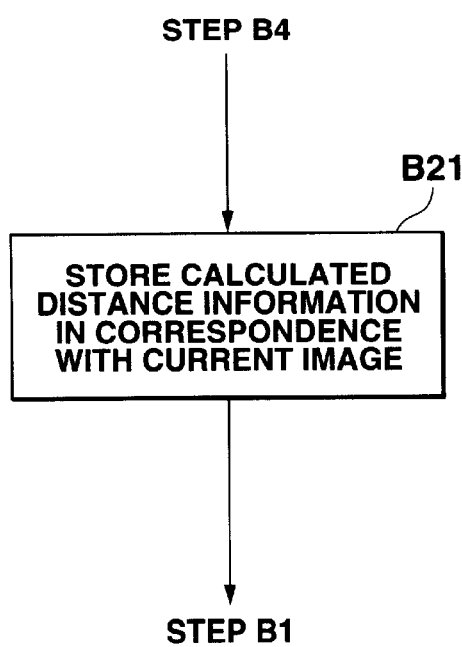
Figure 7D:
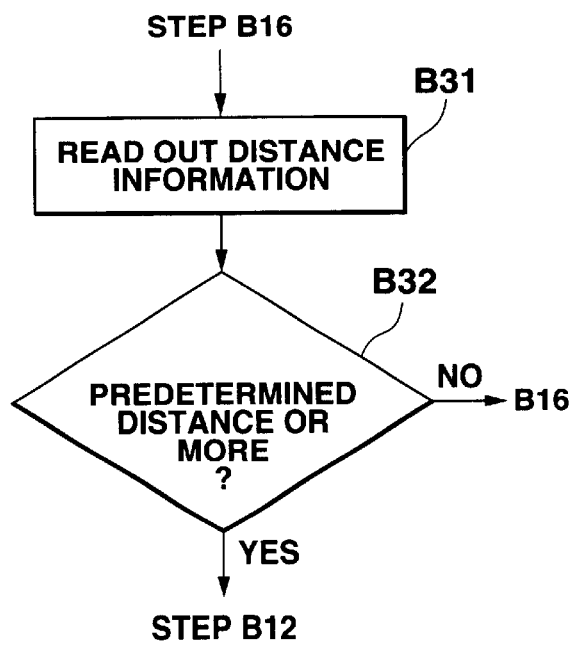

FIGS. 7C and 7D are flow charts, respectively, showing processes in the image pick-up mode and playback mode for explaining modifications of the flow charts shown in FIGS. 7A and 7B.

In the image pick-up mode, if the distance between two points is calculated in step B4 of FIG. 7A, the flow shifts to step B21 of FIG. 7C to store the calculated distance information in the storage unit 4 in correspondence with the image information acquired by the current image pick-up operation.

Thereafter, the flow returns to step B1 to wait for a next shutter key operation.

In the playback mode, if the image number n is increased by one in step B16 of FIG. 7B, the flow advances to step B31 of FIG. 7D to read out the distance information stored in association with the image information of the image number n. It is determined whether the readout distance information is the predetermined distance or more (step B32).

If NO in step B32, i.e., the readout distance information is shorter than the predetermined distance, the flow returns to step B16 to repeat processes in steps B16, B31, and B32 until the distance information equal to or longer than the predetermined distance is searched for in step B31.

If YES in step B32, i.e., the readout distance information is the predetermined distance or more, the flow returns to step B12 to display the image information designated by the image number n at that time.

In the flow charts of FIGS. 7C and 7D, the image pick-up processing shown in FIG. 7C (FIG. 7A) and playback processing shown in FIG. 7D (FIG. 7B) are executed in the same image search apparatus. It is, however, also possible that only the image pick-up processing shown in FIG. 7C is executed in an electronic still camera with the GPS reception function, the storage information is transferred to an image search apparatus such as a personal computer by removing a detachable memory card from the electronic still camera and attaching it to the image search apparatus, or via a wire (cable or the like) or radio channel (radio waves, infrared rays, or the like), and the playback processing shown in FIG. 7D is executed in the image search apparatus.

In the flow chart of FIG. 7A, the flag information is stored in correspondence with the image information picked-up at a place apart from the image pick-up place of an immediately preceding image information by the predetermined distance or more. Alternatively, a plurality of pieces of image information picked-up at relatively near places may be determined as one group and registered as a group.

Detailed examples of the image pick-up processing when group registration is done in the image pick-up mode, and the search processing and display processing in the playback mode will be described with reference to FIGS. 8A and 8B.

Figure 8A:
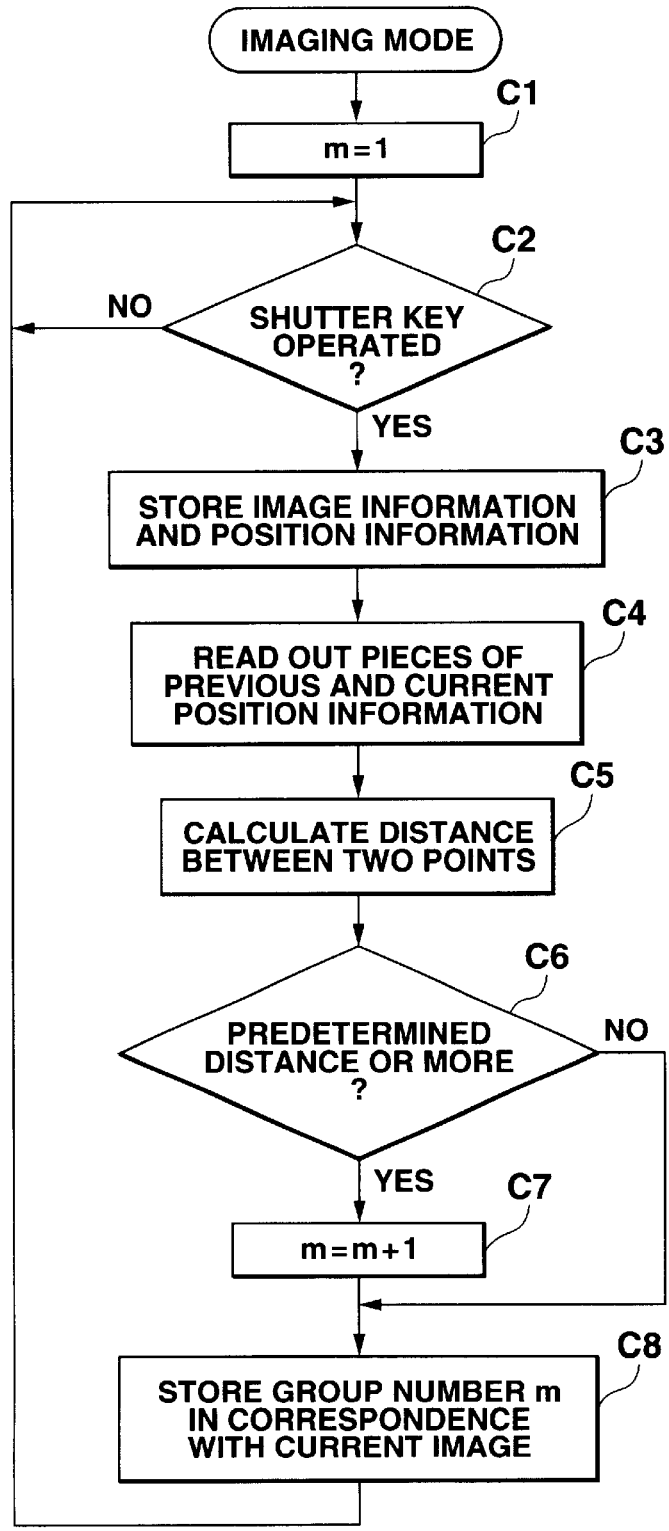
FIGS. 8A and 8B are flow charts, respectively, showing other detailed examples of the image information search/display processing.
Figure 8B:
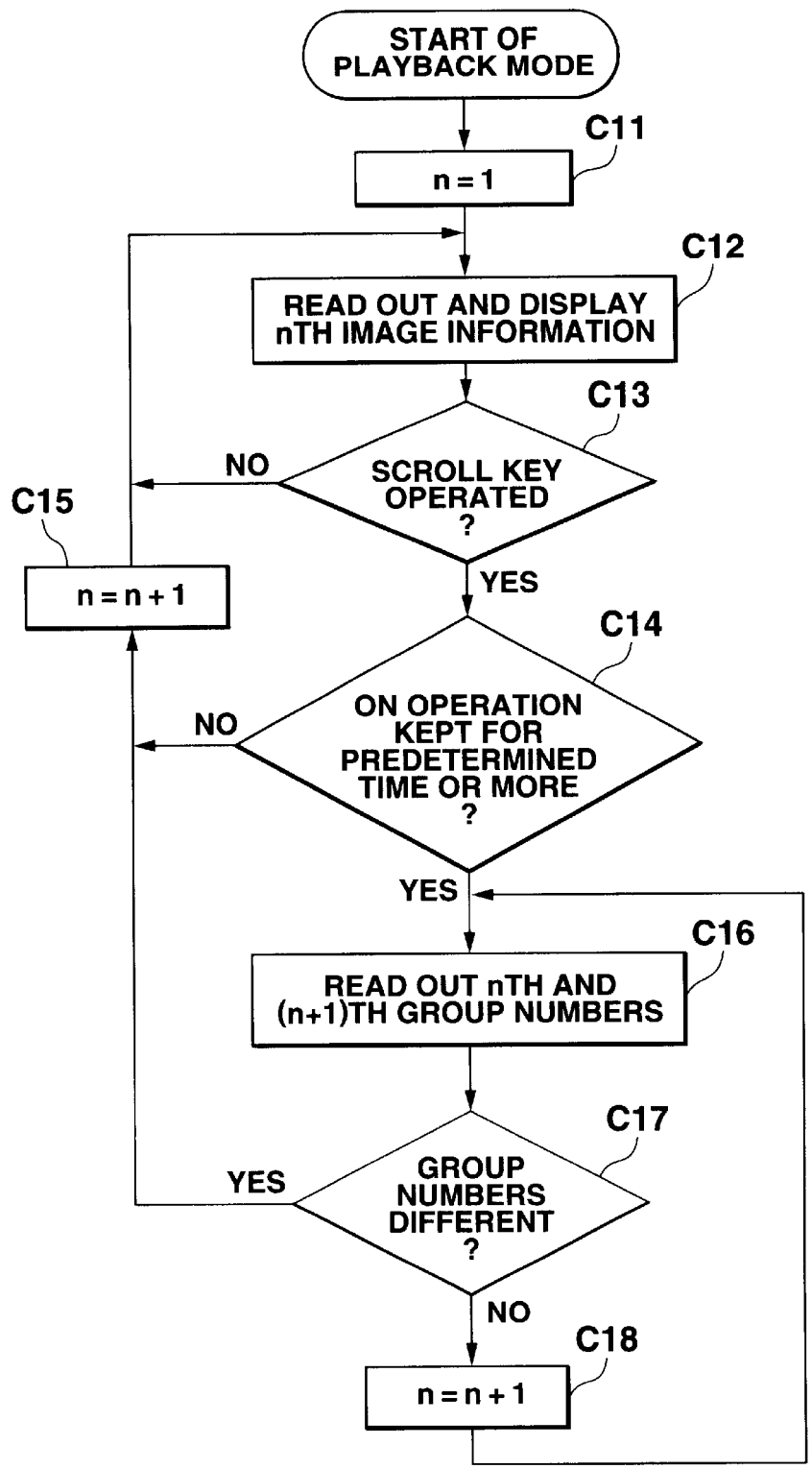

FIGS. 8A and 8B are flow charts, respectively, showing processes in the image pick-up mode and playback mode for explaining other modifications of the flow charts shown in FIGS. 7A and 7B.

In FIG. 8A, if the user operates the mode switching key of the key input unit 11 to set the image pick-up mode, a group number m for group registration is set to m=1 (step C1).

If the user operates the shutter key (YES in step C2), a target image is received as a digital signal by the image information acquisition unit 1 to acquire image information and store it in a predetermined area of the storage unit 4. At the same time, position information about the acquisition place of the image information is acquired by measurement of the position measurement unit 2, and stored in a predetermined area of the storage unit 4 in association with the image information (step C3).

Position information which has been acquired by previous image pick-up operation and previously stored in the storage unit 4, and position information which is acquired by current image pick-up operation and newly stored in the storage unit 4 are read out (step C4).

The distance between two points represented by the readout position information is calculated using the above-mentioned distance calculation method (step C5). It is determined whether the calculated distance is equal to or longer than a predetermined distance (search condition) acquired by the condition acquisition unit 5 (step C6).

If NO in step C6, i.e., the calculated distance is shorter than the predetermined distance, the flow shifts to step C8 to store the group number m at that time as one image identification information in the storage unit 4 in association with the current image information.

If YES in step C6, i.e., the calculated distance (P4–P5 or P9–P10 shown in FIG. 11B) is equal to or longer than the predetermined distance, the flow shifts to step C7 to increment the group number m by one, and to step C8 to store the current group number m as one image identification information in the storage unit 4 in association with the current image information.

The group number is stored in step C8, and then the flow returns to step C2 to wait for a next shutter key operation.

By this processing, pieces of image information picked-up at relatively near places as shown in FIG. 11A are registered as the same group.

In FIG. 8B, if the user operates the mode switching key of the key input unit 11 to set the playback mode, the image number n for designating image information to be displayed on the display unit 9 is set to n=1 (step C11).

Image information (i.e., nth image information) designated by the image number n is read out from the storage unit 4 and displayed on the display unit 9 (step C12).

The nth image information is kept displayed by processing of step C12 until operation of the scroll key of the key input unit 11 is detected in step C13.

If the scroll key is operated during display of the image information (YES in step C13), it is determined whether the scroll key is kept pressed for a predetermined time (e.g., 2 sec) or more (step C14).

If NO in step C14, i.e., the scroll key is released before the predetermined time has elapsed, the flow shifts to step C15 to increment the image number n by one, and returns to step C12 to display next image information.

If YES in step C14, i.e., the scroll key is kept pressed for the predetermined time or more, pieces of group information (group numbers) stored in the storage unit 4 in correspondence with pieces of the nth and (n+1)th image information are read out, and it is determined whether the readout group numbers are different (step C17).

If NO in step C17, i.e., the readout group numbers are equal, the flow shifts to step C18 to increment the image number n by one, and returns to step C16.

Processes in steps C16 to C18 are repeated until the group numbers are determined in step C17 to be different.

If YES in step S17, i.e., the readout group numbers are different as shown in FIG. 11A, the flow advances to step C15 to increment the image number n by one, and returns to step C12 to display pieces of image information (P5 or P10 shown in FIG. 11A) designated by the image number n at that time.

As described above, the flow charts shown in FIGS. 8A and 8B can also attain the same effects as those of the flow charts shown in FIGS. 6, 7A, and 7B.

In step C8 of the flow chart shown in FIG. 8A, the group number is stored in correspondence with each pieces of image information. Alternatively, pieces of image information may be sorted and stored in storage areas assigned to the respective group numbers, or a plurality of pieces of image information (image numbers) belonging to one group may be stored in correspondence with its group number.

In the flow charts of FIGS. 8A and 8B, the distance calculation processing, search condition collation processing, and group number registration processing (steps C4 to C8) are done in the image pick-up mode, but may be done at arbitrary time after the image pick-up mode.

In the flow charts of FIGS. 8A and 8B, the image pick-up processing (group registration) shown in FIG. 8A (and FIG. 10; to be described later) and the playback processing in FIG. 8B (and FIGS. 9A and 9B; to be described later) are executed in the same image search apparatus. It is, however, also possible that only the image pick-up processing shown in FIG. BA is executed in an electronic still camera with the GPS reception function, the storage information is transferred to an image search apparatus such as a personal computer by removing a detachable memory card from the electronic still camera and attaching it to the image search apparatus, or via a wire (cable or the like) or radio channel (radio waves, infrared rays, or the like), and the playback processing shown in FIG. 8B is executed in the image search apparatus.

In the flow charts of FIGS. 8A and 8B, the image pick-up processing (group registration) shown in FIG. 8A (and FIG. 10; to be described later) and the playback processing shown in FIG. 8B (and FIGS. 9A and 9B; to be described later) are executed in the same image search apparatus. It is, however, also possible that only the calculated-distance storage processing is executed in an electronic still camera with the GPS reception function, as shown in FIG. 7C, the storage information is transferred to an image search apparatus such as a personal computer by removing a detachable memory card from the electronic still camera and attaching it to the image search apparatus, or via a wire (cable or the like) or radio channel (radio waves, infrared rays, or the like), and the group registration processing shown in FIG. 8A (and FIG. 10; to be described later) and the playback processing shown in FIG. 8B (and FIGS. 9A and 9B; to be described later) may be executed in the image search apparatus.

In the flow chart of FIG. 8B, the first (or last) image information is searched for and displayed in each group. Alternatively, desired image information (e.g., intermediate image information) in each group may be searched for and displayed (see FIG. 9A), or image information included in the same group may be displayed at once (e.g., displayed on multiple windows) (see FIG. 9B) since the pieces of image information are dividedly stored as groups.

Detailed examples of the search processing and display processing when intermediate image information among pieces of image information belonging to each group is searched for and displayed will be explained with reference to FIG. 9A.

Figure 9A:
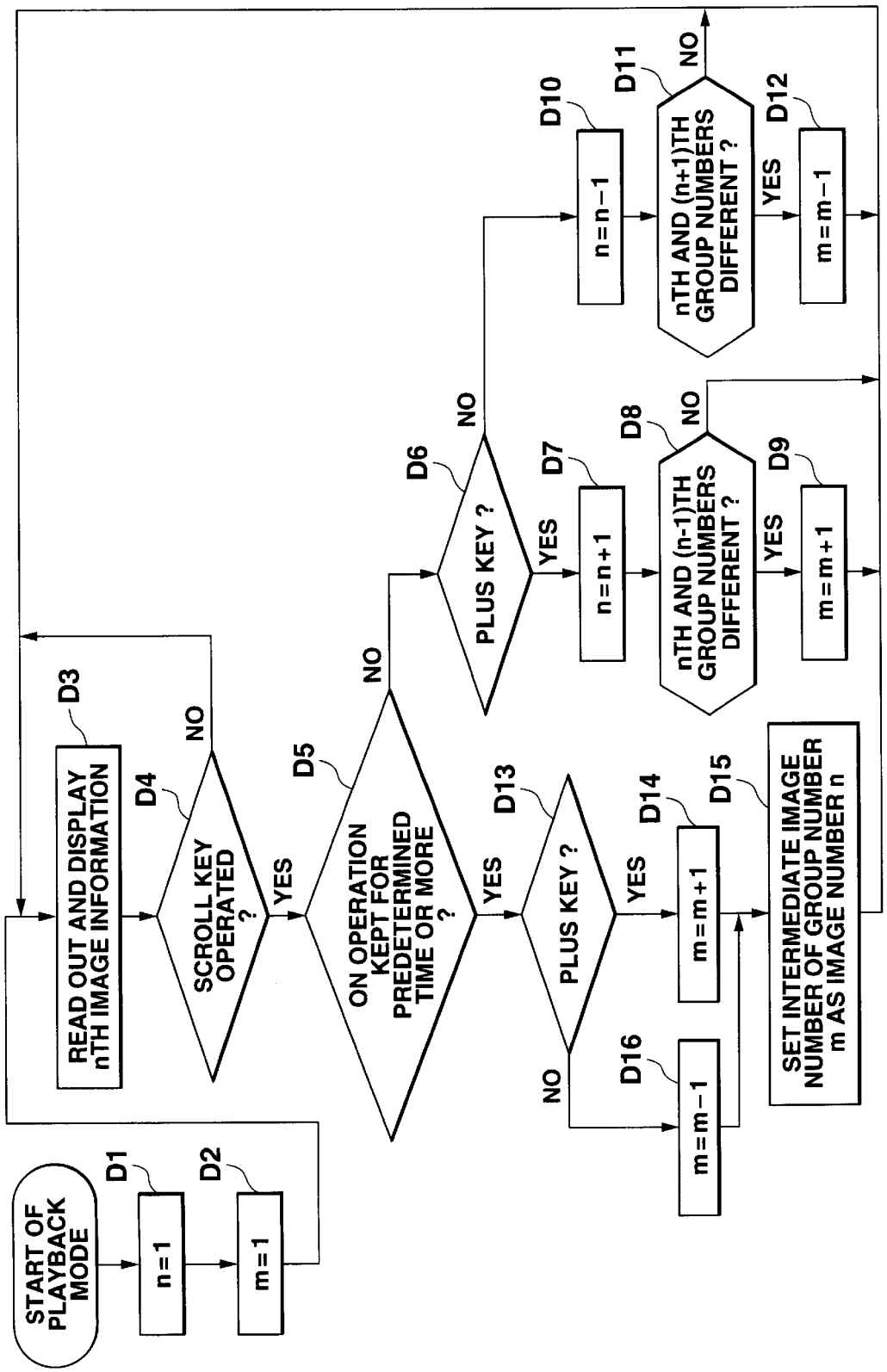
FIGS. 9A and 9B are flow charts showing a modification of the image information search/display processing shown in FIGS. 8A and 8B.

FIG. 9A is a flow chart showing a processing in the playback mode for explaining a modification of the flow chart shown in FIG. 8B.

In FIG. 9A, if the user operates the mode switching key of the key input unit 11 to set the playback mode, the image number n for designating image information to be displayed on the display unit 9 is set to n=1 (step D1), and the group number m representing the group of image information to be displayed on the display unit 9 is set to m=1 (step D2).

Image information (i.e., nth image information) designated by the image number n is read out from the storage unit 4 and displayed on the display unit 9 (step D3).

The nth image information is kept displayed by processing of step D3 until operation of the scroll key of the key input unit 11 is detected in step D4.

If the scroll key (including plus and minus keys) is operated during display of the image information (YES in step D4), it is determined whether the scroll key is kept pressed for a predetermined time (e.g., 2 sec) or more (step D5).

If NO in step D5, i.e., the scroll key is released before the predetermined time has elapsed, the flow shifts to step D6 to determine whether the scroll key operated in step D4 is a plus key or a minus key.

If it is determined in step D6 that the plus key is operated, the image number n is increased by one in step D7, and it is determined whether the group numbers stored in the storage unit 4 in association with the pieces of nth and (n−1)th image information are different (step D8).

If YES in step D8, i.e., the group numbers stored in the storage unit 4 in association with the pieces of nth and (n−1)th image information are different, the group number m is increased by one in step D9 (i.e., the group number of the image information having the image number n set at that time is set). After that, the flow returns to step D3 to read out and display the image information having the image number n.

If it is determined in step D6 that the minus key is operated, the image number n is decreased by one in step D10, and it is determined whether the group numbers stored in the storage unit 4 in association with the pieces of nth and (n+1)th image information are different (step D11).

If YES in step D11, i.e., the group numbers stored in the storage unit 4 in association with the pieces of nth and (n−1)th image information are different, the group number m is decreased by one in step D12 (i.e., the group number of the image information having the image number n set at that time is set). After that, the flow returns to step D3 to read out and display the image information having the image number n.

If YES in step D5, i.e., the scroll key is kept pressed for the predetermined time or more, the flow shifts to step D13 to determine whether the scroll key operated in step D4 is a plus key or a minus key.

If it is determined in step D13 that the plus key is operated, the group number m is increased by one in step D14, and the flow advances to step D15. If it is determined in step D13 that the minus key is operated, the group number m is decreased by one in step D16, and the flow advances to step D15.

In step D15, the image number n is changed to an image number for designating intermediate image information (P2/P3 or P7 shown in FIGS. 11A and 11B) among pieces of image information associated with the group number m. Then, the flow returns to step D3 to display the intermediate image information designated by the image number n at that time.

By this processing, the intermediate image of each group is searched for and displayed. The number of subsequent scroll key operations for displaying a desired image information can be decreased (halved) to increase the search speed, compared to processing in the flow chart of FIG. 8B.

Detailed examples of the search processing and the display processing when pieces of image information included in the same group are displayed at once to select a desired image information will be explained with reference to FIG. 9B.

Figure 9B:
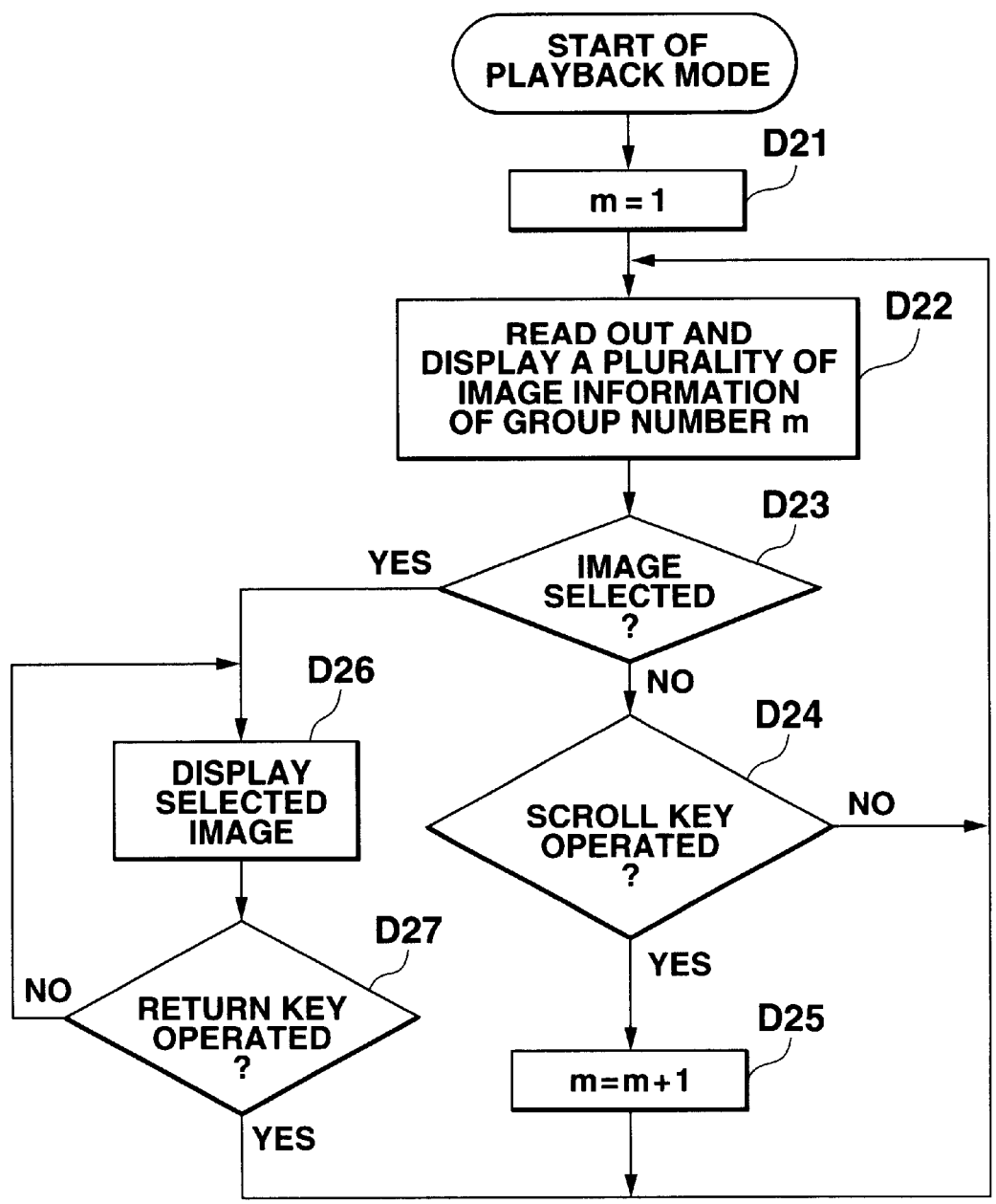

FIG. 9B is a flow chart showing the processing in the playback mode for explaining another modification of the flow chart shown in FIG. 8B.

In FIG. 9B, if the user operates the mode switching key of the key input unit 11 to set the playback mode, the group number m for designating the group of image information to be displayed on the display unit 9 is set to m=1 (step D21).

Pieces of the image information (e.g., P1 to P4 of group 1 or P5 to P9 of group 2 shown in FIG. 11A) belonging to a group designated by the group number m are read out from the storage unit 4, and displayed as a list on the display unit 9 by multi-window display or the like (step D22).

A list of the pieces of image information corresponding to the group number m is kept displayed by the processing of step D22 until any one of the pieces of image information displayed on the list is selected and designated in step D23, or operation of the scroll key of the key input unit 11 is detected in step D24.

If the scroll key is operated during display of a list of images (multi-window) (YES in step D24), the group number m is increased by one in step D25, and the flow returns to step D22 to display pieces of image information belonging to the next group on the list.

If any one of the pieces of image information displayed on the list is selected and designated in step D23, the flow advances to step D26 to display the selected image on the full screen.

As a method of selecting and designating image information, a cursor is displayed on the screen and moved onto a desired image by operating the plus and minus keys. Then, an execution key is operated to select and designate the desired image.

If a return key is operated (step D27) during display of the selected image by processing of step D26, the flow returns to step D22 to display the list again.

By this processing, the scroll key is sequentially operated until pieces of image information of a group including a desired image are displayed on the list. The desired image can be displayed by selecting it from the images displayed on the list. This realizes a simpler, higher-speed search/display processing.

Another detailed example of group registration processing will be explained with reference to FIG. 10.

Figure 10:
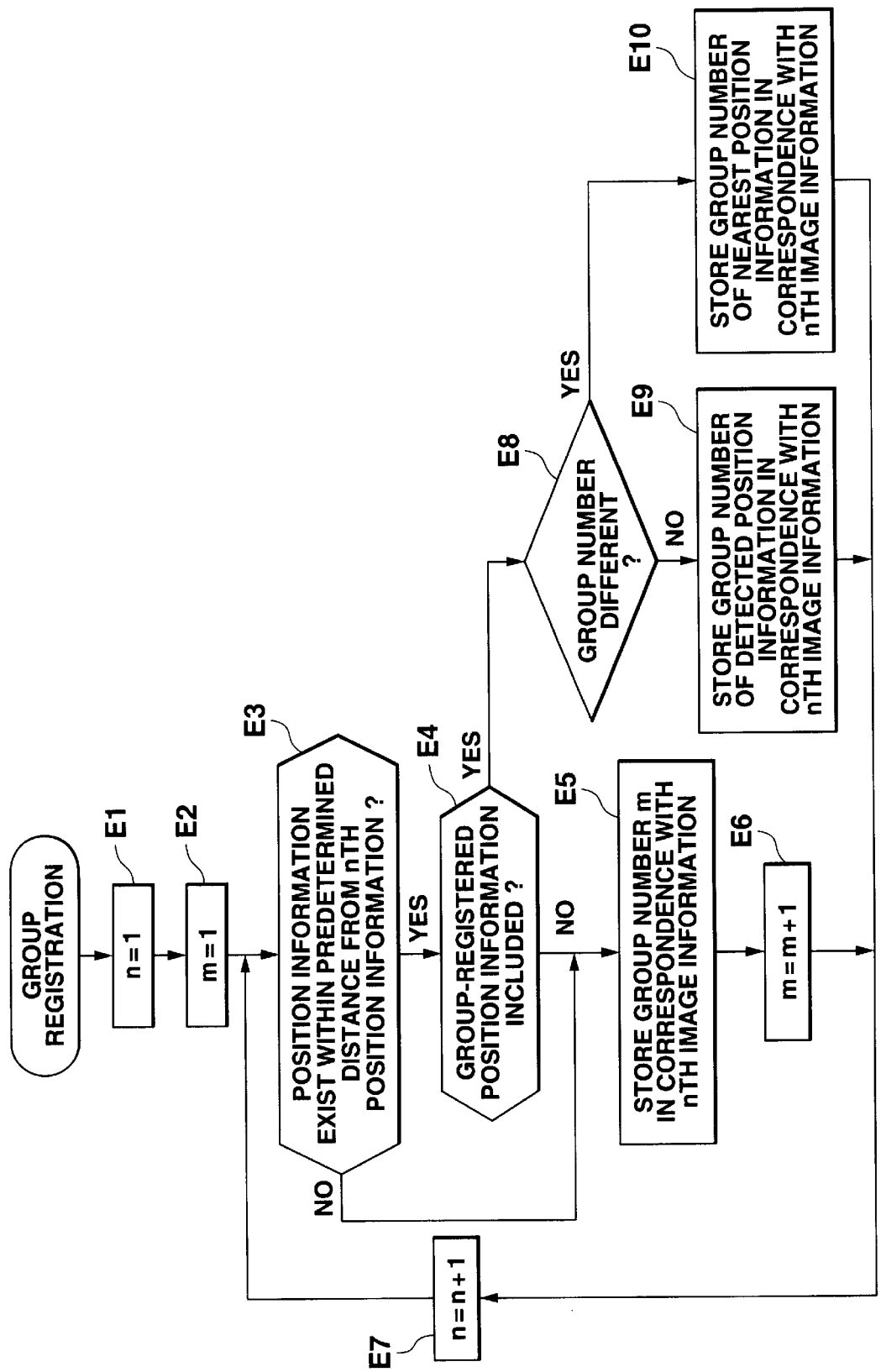
FIG. 10 is a flow chart showing a modification of an image information group registration processing shown in FIG. 8A.

FIG. 10 is a flow chart showing the group registration processing for explaining a modification of the flow chart shown in FIG. 8A.

In FIG. 10, the image number n for designating image information stored in the storage unit 4 is set to n=1 at arbitrary timing (e.g., execution of the group registration processing is instructed by key operation) (step E1). Then, the group number m representing the group of image information is set to m=1 (step E2).

All pieces of the position information stored in the storage unit 4 in association with pieces of image information are read out. It is determined whether such position information exists in the readout position information that within a predetermined distance from the position information of the image information having the image number n (step E3).

More specifically, the distance between two points corresponding to the position information of the image information having the image number n and each of all the remaining pieces of position information is calculated to determine whether a distance equal to or smaller than a predetermined distance exists in the calculated distances.

If YES in step E3, i.e., a distance equal to or smaller than the predetermined distance exists in the calculated distances, the flow shifts to step E4 to determine whether group-registered position information exists in pieces of the detected position information within the predetermined distance, i.e., a group number is stored in association with pieces of image information corresponding to the pieces of the position information within the predetermined distance.

Since the group registration (group number storage) processing is sequentially done from the image information having an image number of 1, pieces of the detected position information within the predetermined distance may be before or after the position information of the image number n undergoing group registration processing.

If NO in step E3 or NO in step E4, i.e., the position information within the predetermined distance does not exits or all of the detected position information within the predetermined distance are not registered, the flow shifts to step E5 to store the currently set group number m as a new group number in correspondence with the image information of the image number n.

The group number m is increased by one in step E6, the image number n is increased by one in step E7, and the flow returns to step E3 to start the group registration processing of next image information.

If YES in step E4, the position information within the predetermined distance include the group-registered position information, the flow advances to step E8 to determine whether there are a plurality of pieces of group-registered position information detected in step E4, and it is determined whether these pieces of position information have different group numbers.

If it is determined in step E8 that only one position information is group-registered or no pieces of position information have different group numbers, the flow advances to step E9 to store the same group number as that of the group-registered position information detected in step E4, in the storage unit 4 in correspondence with the image information of the image number n. Then, the flow returns to step E7.

If it is determined in step E8 that the pieces of position information have different group numbers, the flow shifts to step E10 to detect position information nearest to the position information of the image number n among a plurality of pieces of the position information. The same group number as that of the detected position information is stored in the storage unit 4 in correspondence with the image information of the image number n. Then, the flow shifts to step E7.

By this processing, pieces of image information picked-up at relatively near places can be registered as the same group regardless of the image pick-up order. That is, group registration processing can be done in consideration of only the image pick-up position (place) factor regardless of the image pick-up time factor.

Group registration processing is executed at arbitrary time after image pick-up in the flow chart of FIG. 10, but may be sequentially executed in image pick-up, as shown in the flow chart of FIG. 8A.

In this case, the processing in step E4 need not be executed, and if YES in step E3, i.e., the position information within the predetermined distance exist, the flow immediately shifts to step E8.

In the flow charts of the playback mode shown in FIGS. 6, 7B, 7D, 8B, and 9A, when the scroll key is kept pressed for the predetermined time or more (i.e., in the search processing), only image information satisfying the search condition information is displayed. Alternatively, another image information may be displayed like normal auto-scroll display.

Detailed examples of the search processing and the display processing when another image information is displayed in the search processing will be explained with reference to FIG. 12A.

Figure 12A:
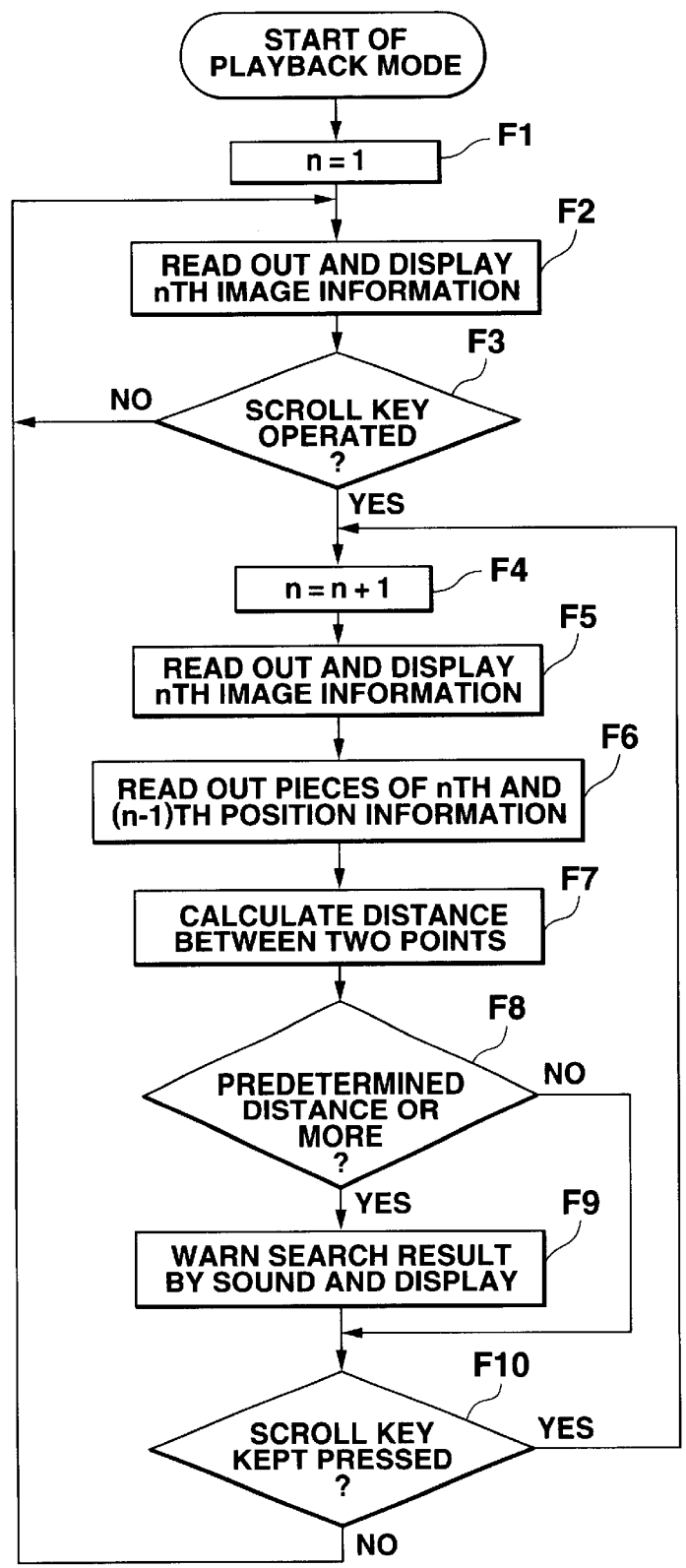
FIGS. 12A, 12B, and 12C are flow charts showing another detailed example of the image information search/display processing.

FIG. 12A is a flow chart for explaining a modification of the flow chart in the playback mode shown in FIGS. 6, 7B, 7D, 8B, and 9A.

Note that the distance calculation processing and the search condition collation processing are performed in the playback mode, similar to the flow chart shown in FIG. 6.

In FIG. 12A, if the user operates the mode switching key of the key input unit 11 to set the playback mode, the image number n for designating image information to be displayed on the display unit 9 is set to n=1 (step F1).

The image information (i.e., nth image information) designated by the image number n is read out from the storage unit 4 and displayed on the display unit 9 (step F2).

The nth image information is kept displayed by processing of step F2 until operation of the scroll key of the key input unit 11 is detected in step F3.

It is determined whether the scroll key is operated during display of the image information (step F3).

If operation of the scroll key is detected, the flow shifts to step F4 to increment the image number n by one. The image information designated by the image number n is read out from the storage unit 4, and displayed on the display unit 9 (step F5).

Subsequently, pieces of the position information stored in the storage unit 4 in association with pieces of nth and (n+1)th image information are read out (step F6).

Then, the distance between two points represented by the pieces of readout position information is calculated using the above-mentioned distance calculation method (step F7). It is determined whether the calculated distance is at least a predetermined distance (search condition) acquired by the condition acquisition unit 5 (step F8).

If YES in step F8, i.e., the calculated distance is longer than the predetermined distance, the flow shifts to step F9 to display a detection mark (icon) or the like at a predetermined position on the display unit 9. In addition, a sound such as an alarm sound is output from a sound output device (not shown) such as a speaker to warn the user of the detection result.

If NO in step F8, the calculated distance is not longer than the predetermined distance, or after warning processing is done in step F9, the flow shifts to step F10 to determine whether the scroll key is kept pressed.

If YES in step S10, i.e., the scroll key is kept pressed, the flow returns to step F4 to repeat processes in steps F4 to F10 until the scroll key is determined to be released.

If NO in step F10, i.e., the scroll key is released, the flow returns to step F2 to cancel auto-scroll (automatic page feed).

As described above, auto-scroll is performed by pressing the scroll key for a predetermined time or more. When the image information picked-up at a place apart from the image pick-up place of immediately preceding image information by a predetermined distance or more is displayed on the display unit 9, a predetermined warning is output. Using this warning as a trigger, the scroll key is released to cancel auto-scroll and switch it to normal manual scroll operation. Pieces of subsequent image information are sequentially displayed to display desired image information.

In the flow chart of FIG. 12A, warning processing is executed when the image information satisfies search condition information. Instead, the display time of the image information satisfying the search condition information may be set longer than the display time of other image information, or the image information satisfying the search condition information may be processed (modified) and displayed.

Figure 12B:
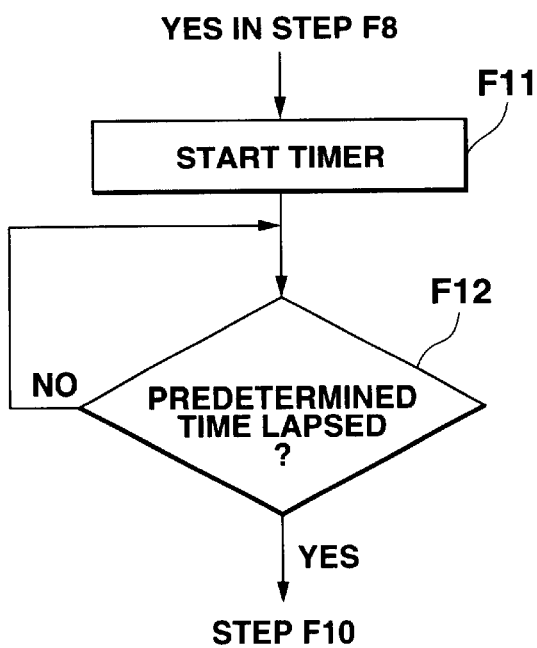
Figure 12C:
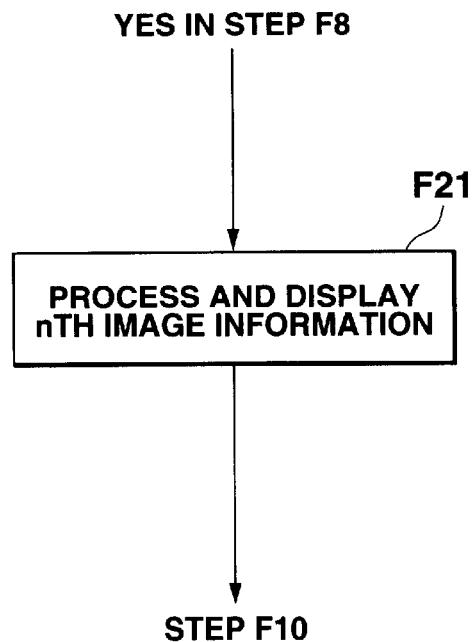

FIGS. 12B and 12C are flow charts for explaining a modification of the flow chart in the playback mode shown in FIG. 12A.

In the playback mode, if YES in step F8 of FIG. 12A, i.e., the calculated distance is longer than the predetermined distance, the flow shifts to step F11 of FIG. 12B to start a timer for counting a predetermined period of time.

The flow waits for detection of time-up in step F12, and then shifts to step F10 of FIG. 12A.

Instead of displaying the piece of image information satisfying the search condition information for a predetermined time, the image information may be kept displayed until the user performs a predetermined key operation.

In the playback mode, if YES in step F8 of FIG. 12A, i.e., the calculated distance is longer than the predetermined distance, the flow shifts to step F21 of FIG. 12C to perform a predetermined processing (e.g., display color change processing or display brightness altering processing) for the image information of the image number n that is read out and displayed in step F5. The processed image information is displayed on the display unit 9, and the flow shifts to step F10 of FIG. 12A.

A detailed example of the search condition processing when the condition acquisition unit 5 acquires, by the learning processing, search condition information for searching for the image information stored in the storage unit will be explained with reference to FIG. 13.

In FIG. 13, pieces of the latitude information having the maximum and minimum values that are stored in the storage unit 4 are searched for and extracted (step G1).

The difference between the searched/extracted maximum and minimum values is calculated (step G2).

Similarly in steps G3 and G4, pieces of the longitude information having the maximum and minimum values that are stored in the storage unit 4 are searched for and extracted, and the difference between the searched/extracted maximum and minimum values is calculated.

In step G5, a predetermined distance is calculated based on the latitude difference and the longitude difference calculated in steps G2 and G4, and registered as a search condition.

In other words, when the latitude difference and the longitude difference are large, a relatively long distance is set; and when the latitude difference and the longitude difference are small, a relatively short distance is set.

Note that the search condition setting processing is not limited to the method shown in FIG. 13. In the flow chart of FIG. 13, for example, even when the latitude difference and the longitude difference are large, the setting distance can be shortened by weighting processing so long as pick-up places locally concentrate.

Figure 14A:
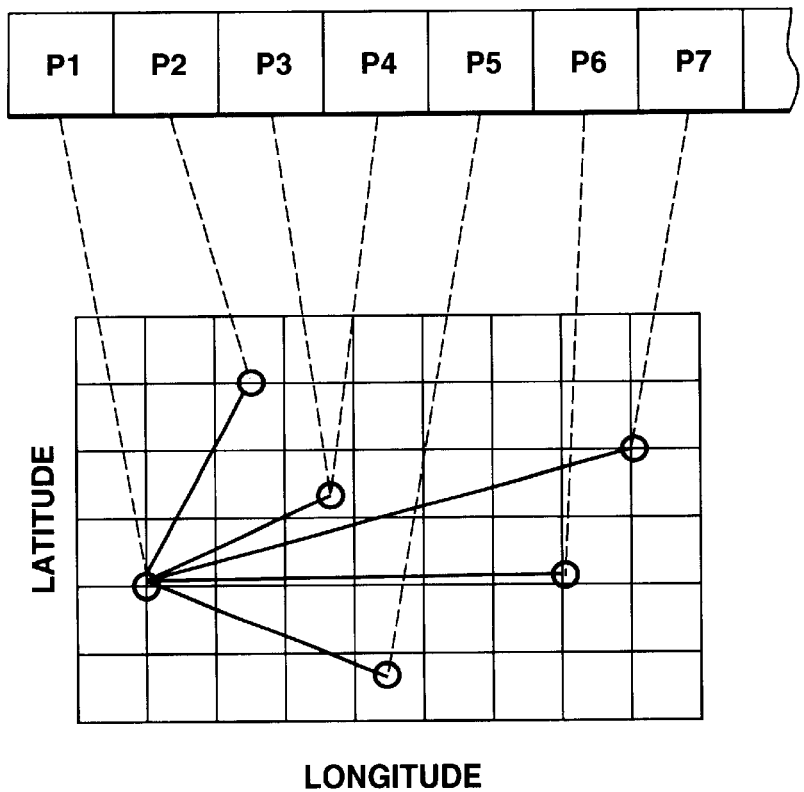
FIGS. 14A and 14B are views showing a still another example of the distance calculation processing and the search condition collation processing.
Figure 14B:
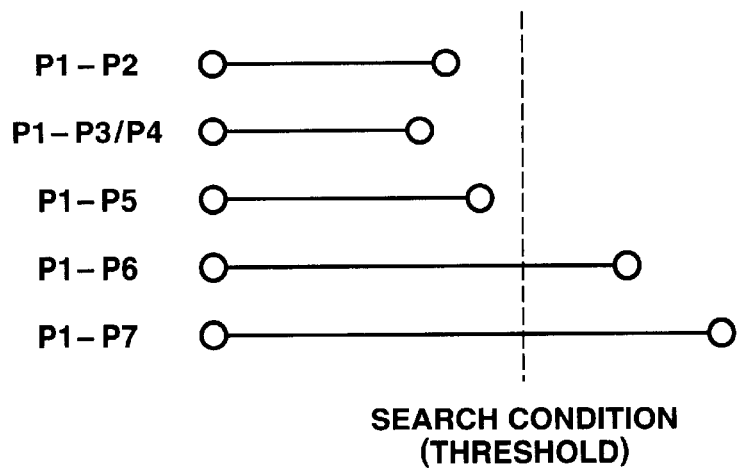

FIGS. 14A and 14B are views showing another example of the distance calculation processing and the search condition collation processing.

As shown in FIG. 14A, similar to the case shown in FIG. 5A, pieces of the position information are extracted for pieces of image information P1, P2, P3, . . . stored in the storage unit 4 in time-series in accordance with acquisition times. In FIG. 14A, the acquisition place of the specific image information P1 is set to a reference position, and absolute distances P1–P2, P1–P3/P4, P1–P5, . . . from the reference position to the acquisition places of other pieces of image information are calculated from the differences in latitude and longitude between two points.

As shown in FIG. 14B, input search condition information is used as a threshold (indicated by the dotted line of FIG. 14B), and pieces of image information P6 and P7 acquired at (apart) places having distances P1–P6 and P1–P7 longer than the threshold are extracted or marked as search results.

According to this distance calculation method, the absolute distance between an arbitrary reference position and image information acquisition position can be calculated. Image information can be searched for within a region or range moved from the reference position in order to acquire the image information.

Note that image information having position information falling within a predetermined distance from an arbitrary reference position may be searched for and displayed.

Figure 15:
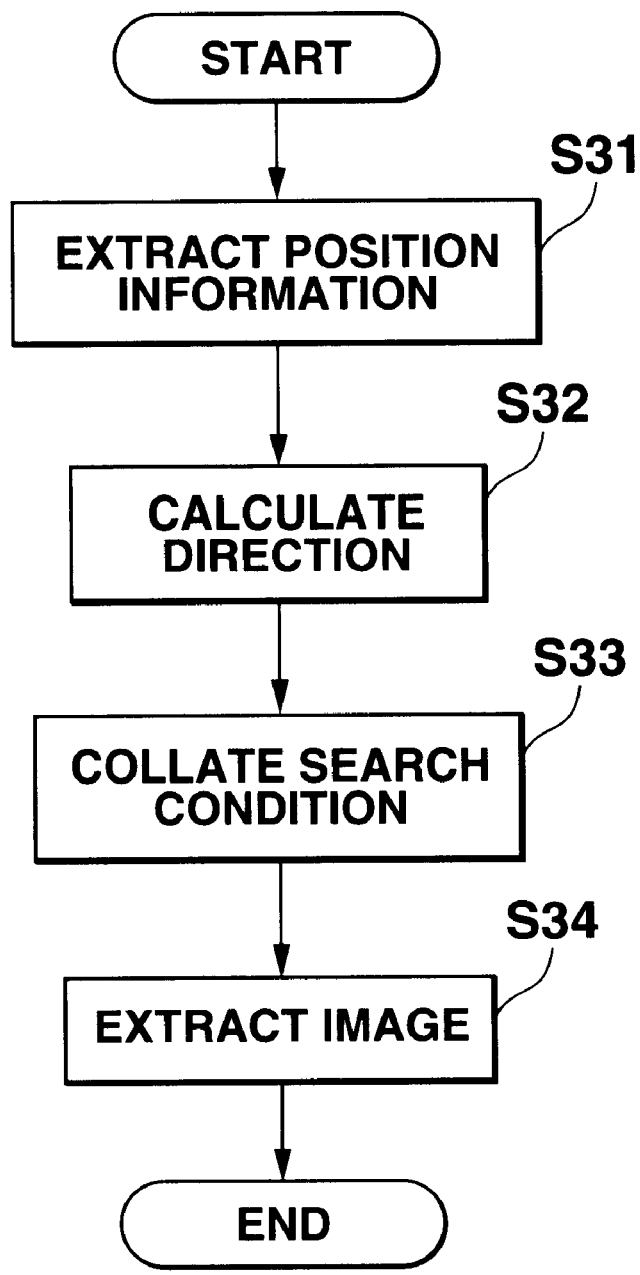
FIG. 15 is a flow chart showing another example of the image information search processing.

FIG. 15 is a flow chart showing another example of the image information search processing in the image search apparatus. In FIG. 15, the azimuth is calculated as the specific amount.

The image search apparatus is operated to set the image playback mode, i.e., image information display state, and pieces of the position information associated with corresponding pieces of image information stored in the storage unit 4 are extracted (step S31). The azimuth between the acquisition places of the pieces of image information is calculated (step S32). More specifically, the relative or absolute azimuth between two points is calculated based on the latitudes and longitudes obtained by the GPS position measurement method.

The calculated azimuth is collated with search condition information for selecting and extracting an image (step S33), and image information having the azimuth meeting the condition is extracted (step S34). In this case, desired search condition information may be input and set in the condition acquisition unit 5 by the user of the image search apparatus by operating the key input unit 11 in the image information search processing. Alternately, desired search condition information may be previously stored in the image search apparatus. Instead, search condition information may be set by learning processing based on the appearance frequency (trend) of the search condition information set in the past, or may be set based on the statistical trend of the currently calculated azimuth.

Detailed examples of the calculation processing of the azimuth of each image information is acquired, and the collation processing of the calculated azimuth and the search condition will be explained with reference to FIGS. 16A and 16B.

Figure 16A:
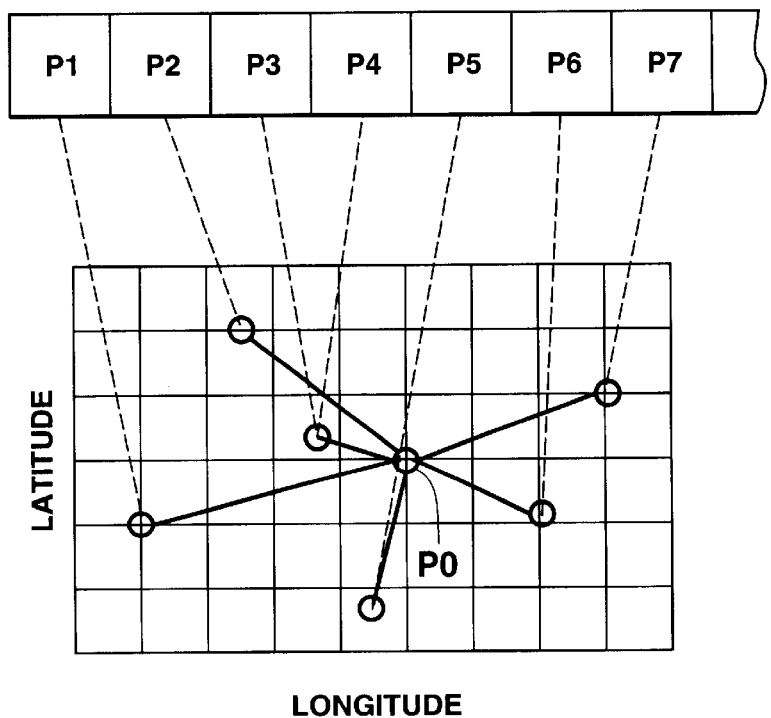
FIGS. 16A and 16B are views showing an example of an azimuth calculation processing and a search condition collation processing.
Figure 16B:
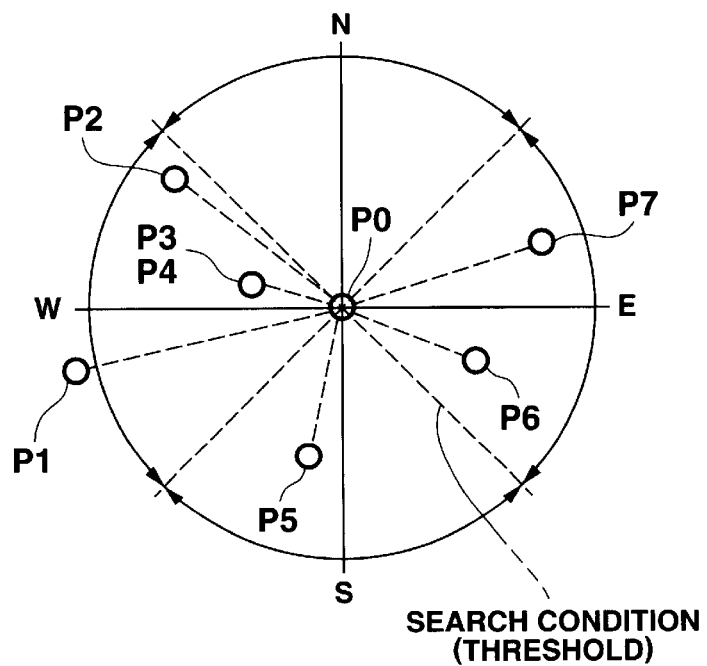

FIGS. 16A and 16B are views showing examples of the azimuth calculation processing and the search condition collation processing.

As shown in FIG. 16A, pieces of the position information are extracted for pieces of image information P1, P2, P3, . . . stored in the storage unit 4 in time-series in accordance with acquisition times. In FIG. 16A, the position information includes a latitude and longitude measured by the GPS position measurement method. The azimuth of the acquisition place of each image information with reference to an arbitrary reference position P0 is calculated as coordinate values from the latitude and longitude or an angle by the Pythagorean theorem.

As shown in FIG. 16B, input search condition information is used as a threshold (indicated by the dotted line of FIG. 16B), and pieces of image information P1, P2, and P3/P4 acquired at places in a desired azimuth, e.g., the west (W) are extracted or marked as search results.

According to this azimuth calculation method, the acquisition place of image information with reference to the arbitrary reference position P0 can be calculated as an absolute azimuth. Image information can be searched for using the azimuth to which the user is moved to acquire the image information. In this case, the reference position may be an arbitrary place such as the user's house or action start point, or a fixed place such as the acquisition place of the first image information P1. In this embodiment, the absolute azimuth with reference to an arbitrary reference point is calculated. Alternatively, a relative azimuth between the acquisition positions of adjacent image information may be calculated.

In the above-described image information search processing, either one of the distance and azimuth is calculated based on position information about the latitude and longitude as the specific amount, and subjected to the search condition collation processing. Alternatively, search area may be narrowed down by a combination of the distance and azimuth, or a combination of the image identification information, time information, and the like stored in the information table area of the storage unit 4, as shown in FIG. 3. This can realize various image search processes.

In the above-described image information search processing, the two-dimensional distance or azimuth is calculated using a latitude and longitude measured by the GPS position measurement method, and subjected to the search condition collation processing. However, the present invention is not limited to this, and an altitude difference may be calculated based on an altitude similarly measured by the GPS position measurement method.

(Image Display Processing)

Image display processing in the image search apparatus according to this embodiment will be described with reference to FIG. 17.

Figure 17:
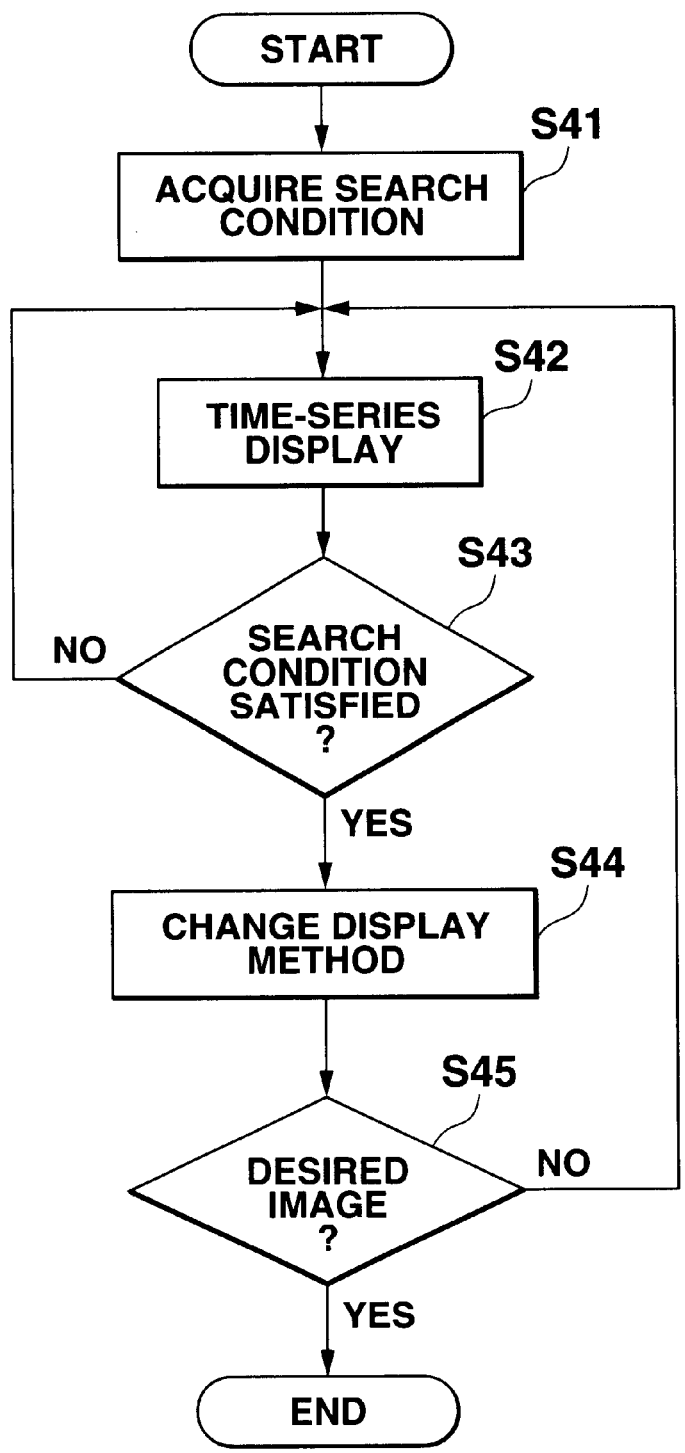
FIG. 17 is a flow chart showing an example of an image display processing.

FIG. 17 is a flow chart showing an example of an image display processing. In FIG. 17, scroll display will be explained in which pieces of image information stored in the storage unit 4 are sequentially displayed in time-series.

The image search apparatus is operated to set the image playback state. Search condition information is acquired by, e.g., operating the condition acquisition unit 5 by the user of the image search apparatus and inputting search condition information (step S41). Then, pieces of image information stored in the storage unit 4 are sequentially displayed in time-series at a predetermined display interval (step S42).

In displaying each image information, the search condition information and the calculated specific amount (distance, azimuth, or altitude difference) are collated (step S43). If image information satisfying the search condition information is detected, the image information is displayed, and the display method is changed (step S44). If the displayed image information is not a desired one (step S45), image information subsequent to the currently displayed image is displayed in time-series.

More specifically, the display method is changed to one in which when the image information satisfying the search condition information is detected, normal scroll display is stopped, and the desired image information is preferentially displayed to make the user recognize the search result. Change examples of the display method include a method of stopping scroll display and displaying only the desired image information (see FIGS. 6, 7B, 7D, 8B, and 9A), a method of displaying the desired image information for a longer time than the predetermined display interval while continuing scroll display, a method of changing the emission color of the display screen or flashing/flicking the desired image information, a method of displaying warning information on the display screen, and a method of informing the user of the search result by a sound from an accessory speaker or the like (see FIGS. 12A to 12C).

In high-speed scroll display adopted in an electronic still camera or the like, only the page number may be displayed on the display means instead of each image information. In this case, the user can be informed of the search result by directly displaying not the page number but the image information satisfying the search condition.

A detailed example of change processing of the image display method will be explained with reference to FIGS. 18A to 18C.

Figure 18A:
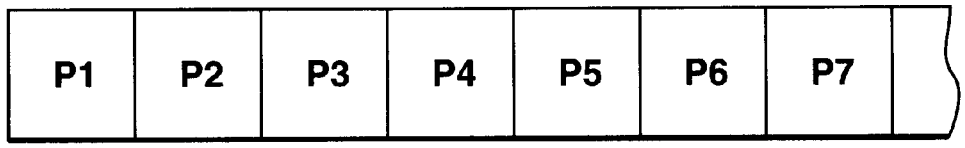
FIGS. 18A, 18B, and 18C are views showing an example of changing the display method in scroll display.
Figure 18B:
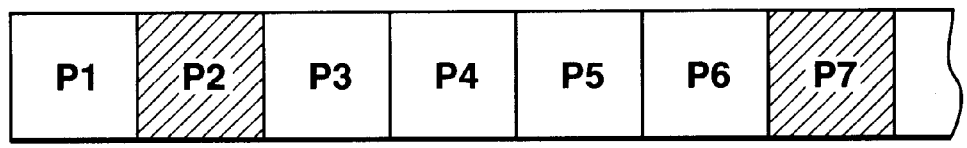
Figure 18C:
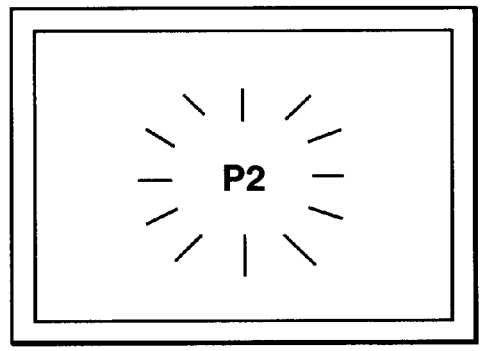

FIGS. 18A to 18C are views showing an example of changing the display method in scroll display.

As shown in FIG. 18A, pieces of image information P1, P2, P3, . . . stored in the storage unit 4 in time-series in accordance with acquisition times are displayed by high-speed scroll. In this case, not image information itself but, e.g., only the page number is scroll-displayed.

When pieces of image information P2 and P7 satisfying the search condition information are detected by the above-mentioned image information search processing, as shown in FIG. 18B, scroll display suspends to display the pieces of image information P2 and P7 instead of the page number, as shown in FIG. 18C.

According to this image display method, when the image information satisfying the search condition information is detected, the display method is changed even during scroll display to reliably inform (or warn) the user of search results and to provide various image display methods.

Figure 19:
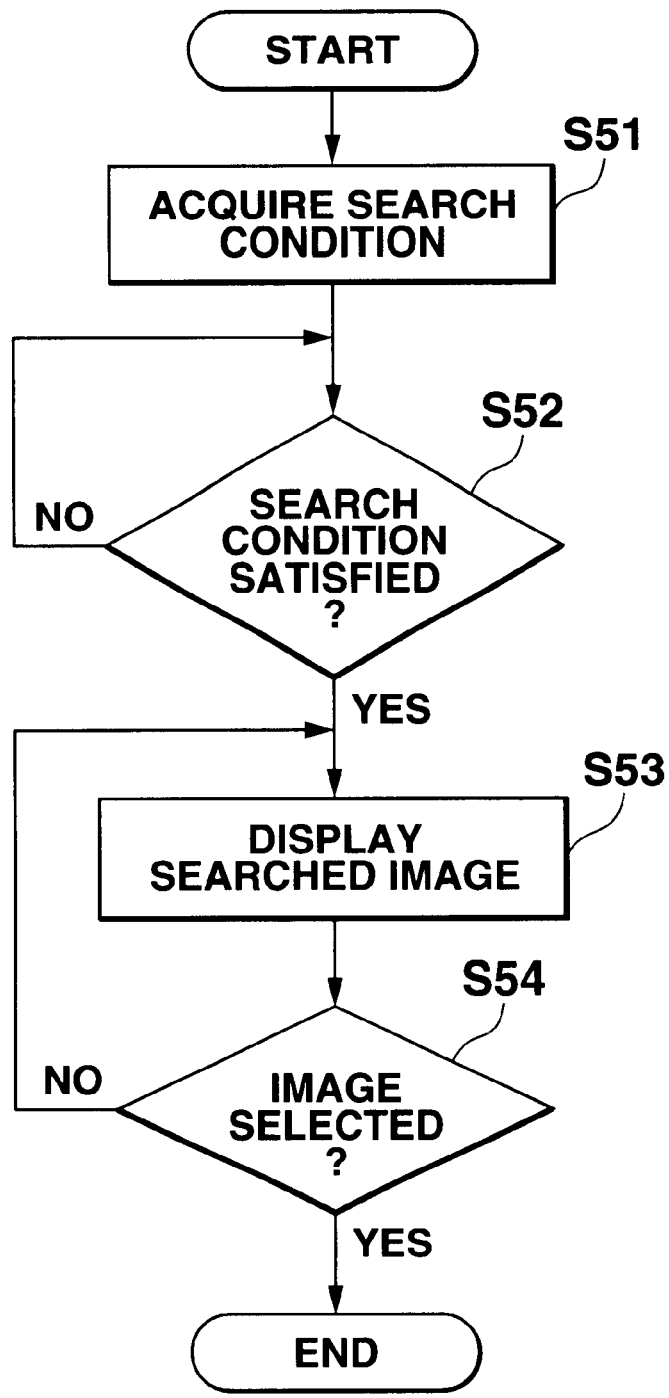
FIG. 19 is a flow chart showing another example of the image display processing.

FIG. 19 is a flow chart showing another example of the image display processing.

The image search apparatus is operated to set the image playback state. Search condition information is acquired by, e.g., operating the condition acquisition unit 5 by the user of the image search apparatus and inputting search condition information (step S51). The search condition information and calculated specific amount (distance, azimuth, or altitude difference) are collated, as described in the above image information search processing (step S52). If the image information satisfying the search condition information is detected, only the detected image information is displayed (step S53).

If the displayed image information is a desired image, this image is selected and displayed as a still image to complete the processing. If the displayed image information is not the desired image, the flow returns to step S53 to display next image information satisfying the search condition information (step S54).

If the image information satisfying the search condition information is desired one, as shown in FIGS. 14A to 16B, the flow shown in FIG. 19 ends. However, if the image information satisfying the search condition information is merely image information for searching for a desired image information, as shown in FIGS. 4 to 11B, the image is selected in step S54 of FIG. 19. After that, image information which is subsequent to the selected image and does not satisfy the search condition information (FIGS. 6 to 7C), or image information of the same group as the selected image (FIGS. 8A to 10) is scroll-displayed (or displayed on multiple windows), as shown in steps S53 and S54. The user must select desired image information again from these pieces of image information.

Note that the display method of the image information satisfying the search condition information may be the above scroll display, or multi-window display in which a plurality of pieces of image information are displayed at once on multiple windows.

According to this image display method, only image information satisfying the search condition information can be first displayed to reliably display search results at a high speed.

Figure 20A:
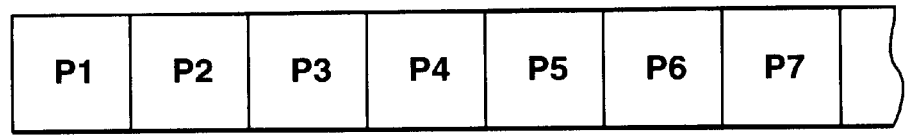
FIGS. 20A, 20B, and 20C are views showing still another example of the image display processing.
Figure 20B:
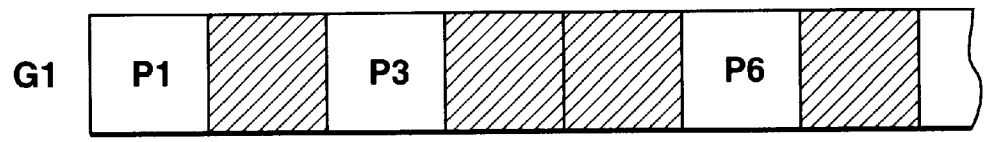
Figure 20B:
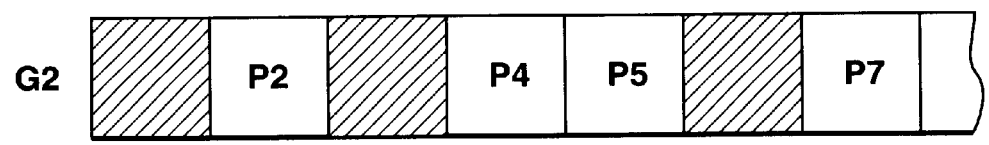
Figure 20C:
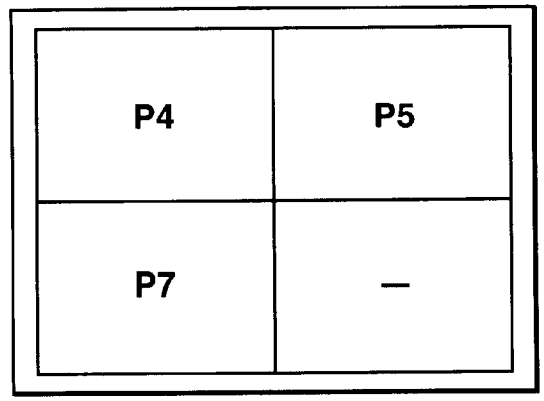

FIGS. 20A to 20C are views showing still another image display processing.

Multi-window display will be explained in which pieces of image information stored in the storage unit 4 are displayed on multiple windows at once.

As shown in FIG. 20A, pieces of image information P1, P2, P3, . . . stored in the storage unit 4 in time-series in accordance with acquisition times are collated with acquired search condition information and calculated a specific amount. As shown in FIG. 20B, the pieces of image information are classified into a group G2 of pieces of image information (e.g., P2, P4, P5, P7, . . . ) satisfying the search condition information and a group Gi of the remaining image information (e.g., P1, P3, P6, . . . ).

Only the first image information (representative image) P2 is displayed among the pieces of image information P2, P4, P5, P7, . . . belonging to the image group G2 satisfying the search condition. If the user selects this image information P2, the pieces of non-displayed image information P4, P5, P7, . . . belonging to the same group G2 are displayed at once on the screen divided into four or nine windows.

By this method, pieces of image information are grouped. Alternatively, the image information P2 satisfying the search condition information, and subsequent pieces of image information P3 to P6 (image information subsequent to one satisfying the search condition information before P7) may be grouped. In this case, only P2 as the representative image of the image group satisfying the search condition information is first displayed. If the user selects the image P2 as a desired one, the pieces of non-displayed image information P3 to P6 are displayed at once on the screen divided into four or nine windows.

According to this image display method, pieces of image information stored in the storage unit are grouped in advance on the basis of the search condition information. Multi-window display allows the user to recognize a plurality of pieces of image information at once. Search results can be reliably displayed at a high speed. In this embodiment, the first image information is displayed as the representative image of the image information group satisfying the search condition information. However, arbitrary image information other than the first image information may be displayed.

In this embodiment, the specific amount calculation processing and image information search processing based on the position information are performed in the playback mode. Alternatively, the specific amount may be calculated and collated with preset search condition information in storing the image information in association with the position or time information, and the image information may be stored in association with the specific amount and search results (marking). When the marked image information is to be displayed, the marking contents, i.e., search condition information, and image information satisfying the search condition information are displayed by searched-image display operation. More specifically, characters such as "search distance: 10 km or more" are displayed on image information in scroll display or multi-window display. This informs (or warns) the user of the displayed image information group (classification).

In this embodiment, the latitude information and longitude information based on the GPS position measurement method are used as the position information representing a piece of the image information acquisition position. By applying this method, the image information acquisition position can be measured and used as the search information regardless of the weather and the like so long as the place is open from a position measurement satellite. In addition, high-precision position information can be easily acquired using various techniques stored in a navigation system or the like. Note that the method of calculating the position information about the image information acquisition place is not limited to the GPS position measurement method, and may be, e.g., a PHS (Personal Handyphone System) position confirmation system.

An embodiment of applying the image search apparatus and method according to the present invention to an electronic still camera with the GPS reception function will be described.

Figure 21A:
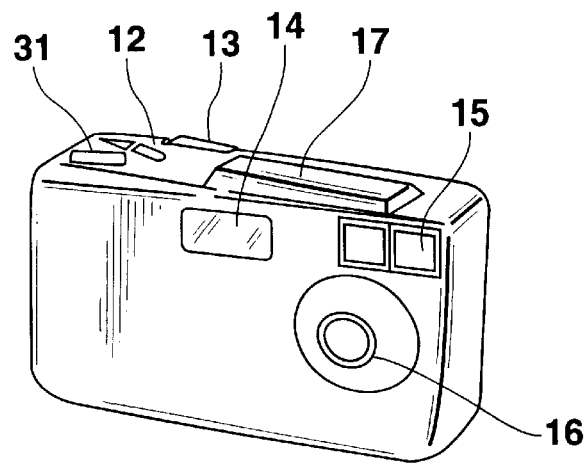
FIGS. 21A and 21B are views showing the outer appearance of an example of an electronic still camera with a GPS reception function to which the image search apparatus and method according to the present invention are applied.
Figure 21B:
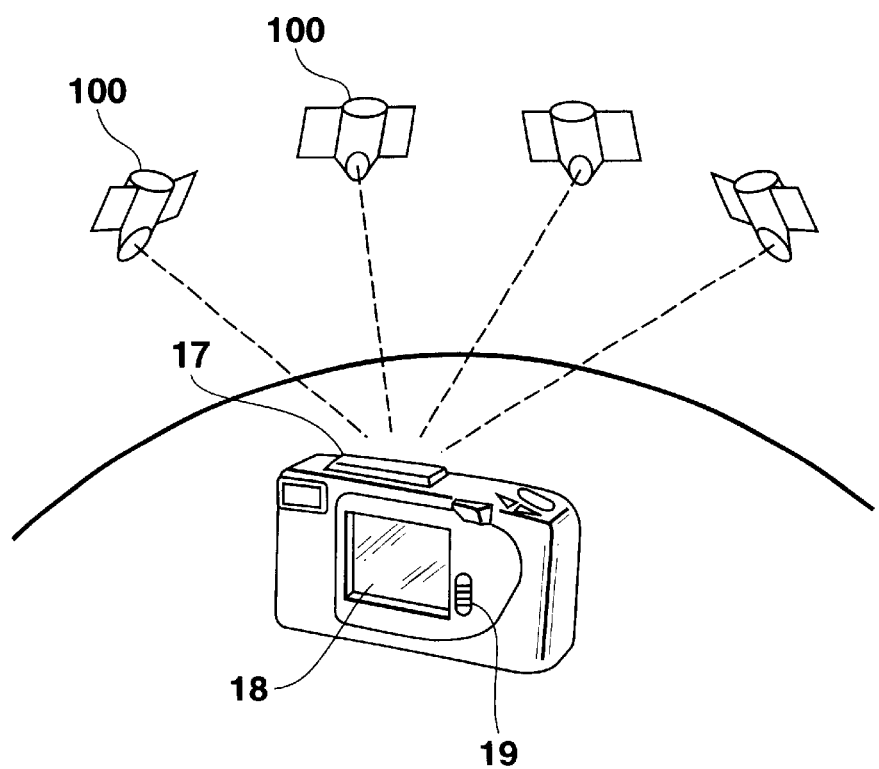

FIGS. 21A and 21B are views showing the outer appearance of an example of the electronic still camera according to the present invention.

As shown in FIGS. 21A and 21B, the electronic still camera of this embodiment comprises various peripheral key switches (corresponding to the key input unit 11 and condition acquisition unit 5) such as a shutter key 31, plus/minus key 12, power switch 13, and REC/PLAY key 19, camera mechanism (corresponding to the image information acquisition unit 1) including an electronic flash 14, optical viewfinder 15, and objective lens 16, GPS reception unit 17 (corresponding to the position measurement unit 2), and LCD 18 (corresponding to the display unit 9).

The respective components will be sequentially explained.

The shutter key 31 functions as a shutter for receiving an image of an object in image pick-up (recording mode). When a menu key is pressed in the recording mode or playback mode, the shutter key 31 is used as a multifunction key additionally functioning as a YES key for selecting an arbitrary item from various pieces displayed on the LCD 18. The menu key has a function of setting various systems, and displays on the LCD 18 various pieces such as an erasure of image in the playback mode and the recording image resolution necessary for image recording, auto-focus ON/OFF state, and the like in the recording mode.

The plus/minus key 12 has a function of selecting reproduced images and various system settings. "Plus" means the selection direction, e.g., direction toward the latest image for image selection, and "minus" means the opposite direction.

The power switch 13 is used to turn on/off the operation power supply of the electronic still camera. The REC/PLAY key 19 switches between the recording mode of image pick-up and recording an image of a desired object and the playback mode of reproducing and displaying the recorded image.

In addition, the key switches of the electronic still camera include a display key having a function of overlappingly displaying various pieces of information on an image displayed on the LCD 18, self-timer key for setting the self-timer, and flash mode key for setting flashlight conditions. The types and names of the key switches may be different between manufacturers and devices. However, the key switches substantially have the above-described functions.

By operating these key switches, an image of a desired object is picked-up and recorded via the camera mechanism in the recording mode. In the playback mode, the search condition input settings in reproducing and displaying recorded images, the position information about the image pick-up point, and the like can be displayed.

The electronic flash 14 is arranged near the objective lens 16, and emits a predetermined quantity of flashlight in accordance with the object illuminance. The optical viewfinder 15 has an optical system interlocked with the focusing mechanism of the objective lens 16. An user directly observes the object image through this optical system, and defines the image pick-up range.

The objective lens 16 generally has an optical system constituted by a combination of a plurality of lenses. The objective lens 16 forms an image of the object on the light-receiving surface of a CCD as a pixel sensor (not shown), converts the image into an electrical signal, and generates a high-resolution frame image (image signal).

This camera mechanism enables image pick-up and storing an image of a desired object as a digital signal.

The GPS reception unit 17 receives a signal (satellite wave) generated by a position measurement satellite 100 on the basis of the GPS position measurement method. The GPS reception unit 17 converts the received satellite wave into digital data by a known signal processing circuit, and decodes the digital data to obtain time and satellite orbit data. The image pick-up time and image pick-up place are calculated based on these data.

The LCD 18 is made from a TFT color liquid crystal having a clear display characteristic, natural color development, and low power consumption. In the recording mode, pieces of image information picked-up by the camera mechanism are successively displayed to facilitate determination of the object. In the playback mode, images are sequentially scrolled or displayed on multiple windows.

Figure 22:
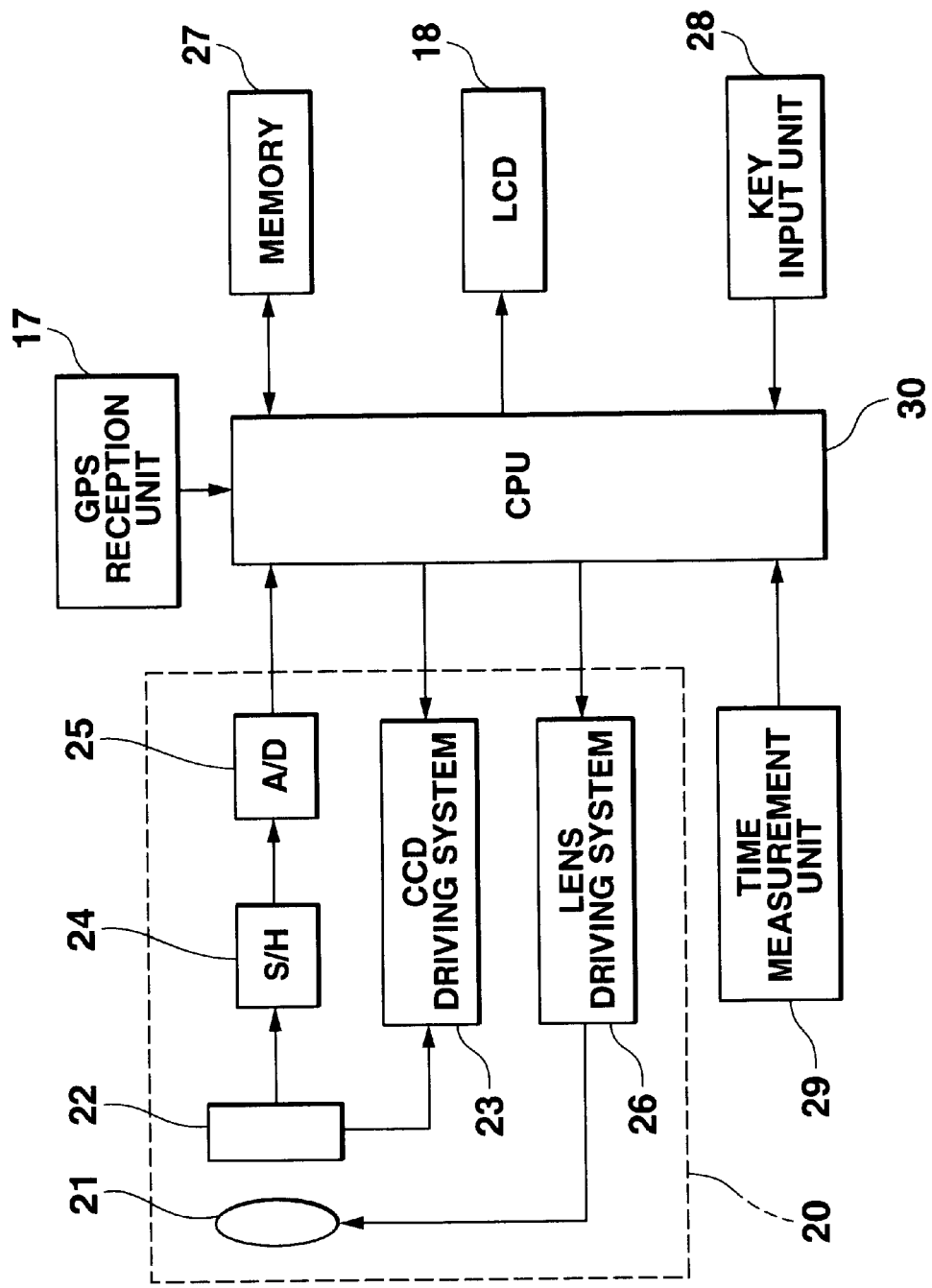
FIG. 22 is a block diagram showing an example of the electronic still camera with the GPS reception function shown in FIGS. 21A and 21B.

FIG. 22 is a block diagram showing the electronic still camera according to the embodiment.

In FIG. 22, reference numeral 20 denotes a camera mechanism (corresponding to the image information acquisition unit 1) having an objective lens 21, CCD 22, CCD driving system 23, sample-and-hold (S/H) circuit 24, analog-to-digital (A/D) converter 25, lens driving system 26, and the like. The electronic still camera comprises the GPS reception unit 17 (corresponding to the position measurement unit 2) and LCD 18 (corresponding to the display unit 9). Reference numeral 27 denotes a memory (corresponding to the storage unit 4); 28, a key input unit (corresponding to the condition acquisition unit 5); 29, a timepiece unit (corresponding to the time measurement unit 3); and 30, a CPU (corresponding to the arithmetic unit 6, search unit 7, and display control unit 8).

The respective components will be sequentially explained.

The CCD 22 is a solid-state image pick-up device for converting two-dimensional optical information into time-series (serial) analog electrical signals. The CCD driving system 23 comprises a circuit for driving the CCD 22, and controls each pixel of the CCD 22 to start photoelectric conversion and output accumulated charges.

The S/H circuit 24 samples the time-series analog electrical signals output from the CCD 22 at a frequency coping with the resolution of the CCD 22. The A/D converter 25 converts the analog electrical signals sampled by the S/H circuit 24 into digital signals.

The lens driving system 26 adjusts and drives the focus of the objective lens 21 on the basis of the distance to the object that is measured by a measurement mechanism such as an autofocusing mechanism (not shown).

The memory 27 is a programmable image memory used to store, in areas shown in FIG. 3 in the recording mode, image information of a picked-up object, and the image pick-up position information and the image pick-up time information calculated based on signals received from the position measurement satellite 100 in association with each image information. The memory 27 has a capacity enough to store a plurality of images.

The timepiece unit 29 is a crystal timepiece incorporated in the electronic still camera. The timepiece unit 29 independently displays the current time and provides image pick-up time information. In addition, the timepiece unit 29 suppresses an error mixed in the position information by comparing the time with a time component included in the satellite wave received via the GPS reception unit 17.

The CPU 30 executes predetermined control programs to control the whole camera operation. Recording mode programs and playback mode programs are written in the internal ROM of the CPU 30, and loaded from the internal ROM to the internal RAM of the CPU 30 and executed in the respective modes.

In particular, the CPU 30 executes processing of storing an image signal picked-up by the camera mechanism 20 in the memory 27 in association with image pick-up position information, image pick-up time information, and the like calculated by the GPS reception unit 17, processing of searching for and extracting image information satisfying search condition information from pieces of image information stored in the memory 27 on the basis of the search condition information set by the key input unit 28 and the like, and processing of controlling the display method of the image information displayed on the LCD 18 and controlling display of various menus, warning information, and the like.

This arrangement makes it possible to store an image picked-up by the electronic still camera in association with the position information and time information as the search information. A desired image can be searched for from many images using the distance or direction (azimuth) between the pick-up places. Particularly, various search processes can be realized by appropriately adding conditions such as the distance and direction in addition to conventional search condition information such as time information. Further, search results can be accurately informed (warned) of and displayed at a high speed.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, in the above embodiments, the distance between two points is calculated by calculating a straight distance. However, the path distance (actual moving distance) between two points may be calculated using road data such as map data.

In the above embodiments, the image search apparatus and method according to the present invention are applied to an electronic still camera. However, the present invention is not limited to the electronic still camera. The present invention can be suitably applied to digital video cameras for business use and consumer use, notebook type personal computer with a card type camera unit, PDA (Personal Digital Assistant) with a camera function, portable document filing system, and handy scanner as far as the mobile terminal device has an image information acquisition function for acquiring a piece of image information at difference places (positions), storage function for storing the image information, and display function for displaying a plurality of pieces of stored image information by a predetermined display method. Further, in recent years, an image picked-up by an electronic still camera is transferred to and processed by an image display device such as a personal computer via the Internet. The present invention can also be applied as an image search method in such image display device.

What is claimed is:

1. An image search apparatus comprising:
   means for storing a plurality of pieces of image information;
   means for displaying the pieces of image information stored in said storing means;
   first display control means for causing the pieces of image information stored in said storing means to be successively displayed by said displaying means in a predetermined order;
   means for searching the pieces of image information for a piece of image information in which a distance between image pick-up positions where the pieces of image information are picked up satisfies a predetermined condition;
   first display switch instructing means for giving an instruction for switching the piece of image information being displayed by said displaying means; and
   second display control means for switching in a skipping manner the piece of image information being displayed by said displaying means, from the piece of image information which is caused by said first display control means to be displayed by said displaying means, to a piece of image information designated based on a result of searching by said searching means, when the instruction for switching the piece of image information being displayed by said displaying means is given by said first display switch instructing means.

2. The image search apparatus according to claim 1, further comprising second display switch instructing means for providing an instruction for switching the piece of image information being displayed by said displaying means, and wherein said first display control means switches the piece of image information being displayed by said displaying means to a subsequent piece of image information when the instruction is given by said second display switch instructing means.

3. The image search apparatus according to claim 2, further comprising a display switch instructing button, and wherein said first display switch instructing means provides the instruction for switching the piece of image information being displayed by said displaying means when a time period for which said display switch button is continuously operated is equal to or more than a predetermined time period, and said second display switch instructing means provides the instruction for switching the piece of image information being displayed by said displaying means, when the time period for which said display switch button is continuously operated is less than the predetermined time period.

4. The image search apparatus according to claim 1, wherein said first display control means causes the pieces of image information stored in said storing means to be successively displayed by said displaying means in an image pick-up order.

5. The image search apparatus according to claim 1, wherein said storing means stores image pick-up order of the nieces of image information and said searching means searches for two pieces of image information which are sequentially picked-up and in which the distance between the image pick-up positions satisfies a predetermined condition.

6. The image search apparatus according to claim 1, wherein said storing means further stores image pick-up position information indicating image pick-up positions of the pieces of image information in association with the pieces of image information, and further comprising means for calculating a distance between the image pick-up positions indicated by the image pick-up information stored in said storing means, and wherein said searching means searches for a piece of image information which satisfies a predetermined condition with respect to the distance calculated by said calculating means.

7. The image search apparatus according to claim 6, wherein said calculating means starts to calculate the distance between the image pick-up positions when the instruction for switching the piece of image information being displayed by said displaying means is given by said first display switch instructing means and said second display control means switches in a skipping manner the piece of image information being displayed by said displaying means from the piece of image information which is caused by said first display control means to be displayed by said displaying means, to the piece of image information which is searched for by said searching means.

8. The image search apparatus according to claim 6, further comprising image information acquiring means for acquiring pieces of image information, and image pick-up position information acquiring means for acquiring image pick-up position information indicating image pick-up positions of the pieces of image information acquired by said image informatior acquiring means, and wherein said storing means stores the pieces of image information acquired by said image information acquiring means and the image pick-up position information acquired by said image pick-up position information acquiring means in association with the acquired pieces of image information and the acquired image pick-up position information.

9. The image search apparatus according to claim 1, wherein said storing means further stores identification information which indicates that the piece of image information is a piece of image information in which a distance between image pick-up positions of the piece of image information and another piece of image information satisfies a predetermined condition, in association with the piece of image information, said searching means searches for the piece of image information in association with which the identification information is stored in said storing means.

10. The image search apparatus according to claim 9, wherein said searching means starts to search for the piece of image information when the instruction for switching the piece of image information being displayed by said displaying means is given by said first display switch instructing means, and said second display control means switches in a skipping manner the piece of image information being displayed by said displaying means, from the piece of image information which is caused by said first display control means to be displayed by said displaying means, to the piece which is searched for by said searching means.

11. The image search apparatus according to claim 9, further comprising:
image information acquiring means for acquiring pieces of image information;
image pick-up position information acquiring means for acquiring image pick-up position information indicating image pick-up positions of the pieces of image information acquired by said image information acquiring means; and
means for calculating a distance between the image pick-up positions indicated by the image pick-up position information acquired by said image pick-up position information acquiring means,
wherein said storing means stores the pieces of image information acquired by said image information acquiring means, and also stores the identification information in association with the pieces of image information in which the distance calculated by said calculating means satisfies a predetermined condition.

12. The image search apparatus according to claim 1, wherein said storing means further stores, in association with the piece of the image information, distance information indicating a distance between image pick-up positions of the piece of image information and another piece of image information, and said searching means searches for a piece of image information in which the distance indicated by the distance information stored in said storing means satisfies a predetermined condition.

13. The image search apparatus according to claim 12, wherein said searching means starts to search for the piece of image information when the instruction for switching the piece of image information being displayed by said displaying means is given by said first display switch instructing means, and said second display control means switches in a skipping manner the place of image information being displayed by said displaying means from the piece of image information which is caused by said first display control means to be displayed by said displaying means, to the piece of image information which is searched for by said searching means.

14. The image search apparatus according to claim 12, further comprising:
image information acquiring means for acquiring pieces of image information;
image pick-up position information acquiring means for acquiring image pick-up position information indicating image pick-up positions of the pieces of image information acquired by said image information acquiring means;
means for calculating a distance between the image pick-up positions indicated by the image pick-up position information acquired by said image pick-up position information acquiring means,
wherein said storing means stores the pieces of image information acquired by said image information acquiring means, and also stores distance information indicating the distance calculated by said calculating means, in association with the pieces of image information.

15. The image search apparatus according to claim 1, wherein said storing means stores pieces of image information which are classified into groups based on distances between image pick-up positions of the pieces of image information, and said searching means searches for a piece of image information belonging to a group different from a group to which the piece of image information, which is caused by said first display control means to be displayed by said displaying means, belongs.

16. The image search apparatus according to claim 15, wherein said searching means starts to search for the piece of image information, when the instruction for switching the piece of image information being displayed by said displaying means is given by the first display switch instructing means, and the second display control means switches in a skipping manner the piece of image information being displayed by said displaying means, from the piece of image information which is caused by said first display control means to be displayed by said displaying means, to the piece which is searched for by said searching means.

17. The image search apparatus according to claim 15, further comprising;
image information acquiring means for acquiring pieces of image information; image pick-up position information acquiring means for acquiring image pick-up position information indicating image pick-up positions of the pieces of image information acquired by said image information acquiring means;
means for calculating a distance between the image pick-up positions indicated by the image pick-up position information acquired by said image pick-up position information acquiring means,
wherein said storing means stores the pieces of image information acquired by said image information acquiring means such that the pieces of image information are classified into groups based on the distance calculated by said calculating means.

18. An image search apparatus comprising:

means for storing a plurality of pieces of image information;

means for displaying the pieces of image information stored in said storing means;

means for searching the pieces of image information stored in said storing means, for a piece of image information in which a distance between image pick-up positions where pieces of image information are picked up satisfies a predetermined condition; and means for informing a user, when a piece of image information searched by said searching means is caused to be displayed by said displaying means, that the piece of image information to be displayed is the piece of image information searched by said searching means.

19. The image search apparatus according to claim 18, further comprising:

display control means for causing the pieces of image information stored in said storing means to be successively displayed by said displaying means in a predetermined order; and display switch instructing means for giving an instruction for switching the piece of image information being displayed by said displaying means, wherein said display control means switches the piece of image information being displayed by said displaying means to a subsequent piece of image information, when the instruction for switching the piece of image information being displayed by the said displaying means is given by the said display switch instructing means.

20. The image search apparatus according to claim 18, wherein when the piece of image information designated based on the result of searching by said searching means is caused to be displayed by said searching means, said informing means informs the user that the designated piece of image information is caused to be displayed by said displaying means, by carrying out a display control different from that carried out to cause another piece of image information to be displayed by said displaying means.

21. The image search apparatus according to claim 20, wherein when the piece of image information designated based on th result of searching by said searching means is caused to be displayed by said displaying means, said informing means informs the user that the designated piece of image information is caused to be displayed by said displaying means, by causing the designated piece of image information to be displayed by said displaying means for a longer time period than when another piece of image information is caused to be displayed by said displaying means.

22. The image search apparatus according to claim 20, wherein when the piece of image information designated based on the result of searching by said searching means is displayed by said displaying means, said informing means informs the user that the designated piece of image information is displayed by said displaying means by subjecting the designated piece of image information to image processing different from that of another piece of image information.

23. An image search apparatus comprising:

means for storing a plurality of pieces of image information;

means for searching the pieces of image information stored in said storing means for a piece of image information in which a distance between image pick-up positions where pieces of image information are picked up satisfies a predetermined condition; and means for determining the predetermined condition based on a plurality of image pick-up positions where the pieces of image information stored in said storing means are picked up.

24. The image search apparatus according to claim 23, wherein said determining means determines the predetermined condition based on distribution of the plurality of image pick-up positions.

25. An image search method comprising:

a step of causing a plurality of pieces of image information stored in a memory to be successively displayed on a display in a predetermined order;

a step of giving an instruction for switching the piece of image information being displayed on the display;

a step of searching the pieces of image information stored in the memory, for a piece of image information in which a distance between image pick-up positions where pieces of image information are picked up satisfies a predetermined condition, when the instruction for switching the piece of image information being displayed on the display is given; and a step of causing the piece of image information, which is searched for in said searching step, is to be displayed on the display.

* * * * *